United States Patent
Inoue et al.

(10) Patent No.: US 12,550,211 B2
(45) Date of Patent: Feb. 10, 2026

(54) BASE STATION AND TERMINAL APPARATUS

(71) Applicant: NIPPON TELEGRAPH AND TELEPHONE CORPORATION, Tokyo (JP)

(72) Inventors: Yasuhiko Inoue, Musashino (JP); Kengo Nagata, Musashino (JP); Akira Kishida, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 369 days.

(21) Appl. No.: 18/030,167

(22) PCT Filed: Oct. 13, 2020

(86) PCT No.: PCT/JP2020/038621
§ 371 (c)(1),
(2) Date: Apr. 4, 2023

(87) PCT Pub. No.: WO2022/079801
PCT Pub. Date: Apr. 21, 2022

(65) Prior Publication Data
US 2023/0371099 A1    Nov. 16, 2023

(51) Int. Cl.
*H04W 76/15* (2018.01)
*H04W 24/10* (2009.01)
(Continued)

(52) U.S. Cl.
CPC ........... *H04W 76/15* (2018.02); *H04W 24/10* (2013.01); *H04W 88/02* (2013.01); *H04W 88/08* (2013.01)

(58) Field of Classification Search
CPC ..... H04W 24/10; H04W 88/08; H04W 76/15; H04W 88/02
(Continued)

(56) References Cited

U.S. PATENT DOCUMENTS

| 2012/0077445 A1* | 3/2012 | Konno .................. H04L 5/0094 455/67.11 |
| 2012/0157143 A1 | 6/2012 | Tsunekawa et al. |

(Continued)

FOREIGN PATENT DOCUMENTS

| CN | 104662987 A | 5/2015 |
| CN | 111345063 A | 6/2020 |

(Continued)

OTHER PUBLICATIONS

IEEE Std 802.11-2016, "9.3.3.3 Beacon frame format" and "11.1 Synchronization", Dec. 7, 2016.
(Continued)

*Primary Examiner* — Jungwon Chang

(57) ABSTRACT

A base station according to an embodiment includes first and second wireless signal processing units, and a link management unit. The link management unit establishes a multi-link with a terminal apparatus by using the first and second wireless signal processing units, and sets an anchor link to be used in transmission and reception of control information regarding an operation of the multi-link. The link management unit transmits a first wireless frame requesting change of the anchor link by using the first wireless signal processing unit set to the anchor link, and changes the anchor link from the first wireless signal processing unit to the second wireless signal processing unit if either the first wireless signal processing unit or the second wireless signal processing unit receives a positive response from the terminal apparatus after the first wireless frame is transmitted.

2 Claims, 34 Drawing Sheets

(51) Int. Cl.
 *H04W 88/02* (2009.01)
 *H04W 88/08* (2009.01)

(58) Field of Classification Search
 USPC .......................................................... 370/329
 See application file for complete search history.

(56) References Cited

U.S. PATENT DOCUMENTS

| | | |
|---|---|---|
| 2014/0086200 A1 | 3/2014 | Seok |
| 2019/0158413 A1* | 5/2019 | Patil ................. H04W 28/0838 |
| 2021/0007168 A1* | 1/2021 | Asterjadhi ........ H04W 52/0235 |
| 2022/0287122 A1* | 9/2022 | Wang ..................... H04W 8/22 |
| 2023/0224814 A1* | 7/2023 | Kim .................. H04W 52/0216 |
| | | 370/311 |
| 2023/0292385 A1 | 9/2023 | Kishida et al. |

FOREIGN PATENT DOCUMENTS

| | | |
|---|---|---|
| CN | 116114310 A | 5/2023 |
| EP | 4192109 A1 | 6/2023 |
| WO | WO-2010140347 A1 | 12/2010 |
| WO | WO-2011024646 A1 | 3/2011 |
| WO | 2019169101 A1 | 9/2019 |

OTHER PUBLICATIONS

International Search Report issued in PCT/JP2020/038621, mailed on Feb. 16, 2021; ISA/JP.

\* cited by examiner

Fig. 9

| STA FUNCTION | FREQUENCY BAND | CHANNEL ID | LINK DESTINATION ID | MULTI-LINK | TID |
|---|---|---|---|---|---|
| STA1 (LINK #1) | 6GHz | CH1 | XX | O (ANCHOR) | #1,#2 |
| STA2 (LINK #2) | 5GHz | CH2 | XX | O | #1,#3 |
| STA3 (LINK #3) | 2.4GHz | CH2 | XX | O | #4 |

Fig. 12

| MULTI-LINK CAPABILITY | OPERATIONAL INFORMATION OF LINK #1 | OPERATIONAL INFORMATION OF LINK #2 | OPERATIONAL INFORMATION OF LINK #3 | ... |
|---|---|---|---|---|

Fig. 25

|  | LINK SET | ANCHOR LINK |
|---|---|---|
| FIRST COMBINATION (FIRST MODIFIED EXAMPLE) | COMMON TO ALL TERMINAL APPARATUSES | COMMON TO ALL TERMINAL APPARATUSES |
| SECOND COMBINATION (SECOND MODIFIED EXAMPLE) | ALLOW DIFFERENT SETTINGS OF PLURALITY OF TERMINAL APPARATUSES | COMMON TO ALL TERMINAL APPARATUSES |
| THIRD COMBINATION (THIRD MODIFIED EXAMPLE) | COMMON TO ALL TERMINAL APPARATUSES | ALLOW DIFFERENT SETTINGS OF PLURALITY OF TERMINAL APPARATUSES |
| FOURTH COMBINATION (FOURTH MODIFIED EXAMPLE) | ALLOW DIFFERENT SETTINGS OF PLURALITY OF TERMINAL APPARATUSES | ALLOW DIFFERENT SETTINGS OF PLURALITY OF TERMINAL APPARATUSES |

Fig. 26

FIRST MODIFIED EXAMPLE OF EMBODIMENT
LINK SET FOR TERMINAL APPARATUS 20A

| STA FUNCTION | FREQUENCY BAND | CHANNEL ID | LINK DESTINATION ID | MULTI-LINK | TID |
|---|---|---|---|---|---|
| STA1 (LINK #1) | 6GHz | CH1 | XX | ○ (ANCHOR) | #1,#2 |
| STA2 (LINK #2) | 5GHz | CH2 | XX | ○ | #1,#3 |
| STA3 (LINK #3) | 2.4GHz | CH2 | XX | ○ | #4 |

LINK SET FOR TERMINAL APPARATUS 20B

| STA FUNCTION | FREQUENCY BAND | CHANNEL ID | LINK DESTINATION ID | MULTI-LINK | TID |
|---|---|---|---|---|---|
| STA1 (LINK #4) | 6GHz | CH1 | XX | ○ (ANCHOR) | #1,#2 |
| STA2 (LINK #5) | 5GHz | CH2 | XX | ○ | #1,#3 |
| STA3 (LINK #6) | 2.4GHz | CH2 | XX | ○ | #4 |

Fig. 28

SECOND MODIFIED EXAMPLE OF EMBODIMENT
LINK SET FOR TERMINAL APPARATUS 20A

| STA FUNCTION | FREQUENCY BAND | CHANNEL ID | LINK DESTINATION ID | MULTI-LINK | TID |
|---|---|---|---|---|---|
| STA1 (LINK #1) | 6GHz | CH1 | XX | O (ANCHOR) | #1,#2 |
| STA2 (LINK #2) | 5GHz | CH2 | XX | O | #1,#3 |
| STA3 (LINK #3) | 2.4GHz | CH2 | XX | O | #4 |

LINK SET FOR TERMINAL APPARATUS 20B

| STA FUNCTION | FREQUENCY BAND | CHANNEL ID | LINK DESTINATION ID | MULTI-LINK | TID |
|---|---|---|---|---|---|
| STA1 (LINK #4) | 6GHz | CH1 | XX | O (ANCHOR) | #1,#2 |
| STA2 (LINK #5) | 5GHz | CH3 | XX | O | #1,#3 |
| STA3 (LINK #6) | 2.4GHz | CH3 | XX | O | #4 |

Fig. 31

THIRD MODIFIED EXAMPLE OF EMBODIMENT
LINK SET FOR TERMINAL APPARATUS 20A

| STA FUNCTION | FREQUENCY BAND | CHANNEL ID | LINK DESTINATION ID | MULTI-LINK | TID |
|---|---|---|---|---|---|
| STA1 (LINK #1) | 6GHz | CH1 | XX | O (ANCHOR) | #1,#2 |
| STA2 (LINK #2) | 5GHz | CH2 | XX | O | #1,#3 |
| STA3 (LINK #3) | 2.4GHz | CH2 | XX | O | #4 |

LINK SET FOR TERMINAL APPARATUS 20B

| STA FUNCTION | FREQUENCY BAND | CHANNEL ID | LINK DESTINATION ID | MULTI-LINK | TID |
|---|---|---|---|---|---|
| STA1 (LINK #4) | 6GHz | CH1 | XX | O | #1,#2 |
| STA2 (LINK #5) | 5GHz | CH2 | XX | O (ANCHOR) | #1,#3 |
| STA3 (LINK #6) | 2.4GHz | CH2 | XX | O | #4 |

Fig. 33

FOURTH MODIFIED EXAMPLE OF EMBODIMENT

LINK SET FOR TERMINAL APPARATUS 20A

| STA FUNCTION | FREQUENCY BAND | CHANNEL ID | LINK DESTINATION ID | MULTI-LINK | TID |
|---|---|---|---|---|---|
| STA1 (LINK #1) | 6GHz | CH1 | XX | O (ANCHOR) | #1,#2 |
| STA2 (LINK #2) | 5GHz | CH2 | XX | O | #1,#3 |
| STA3 (LINK #3) | 2.4GHz | CH2 | XX | O | #4 |

LINK SET FOR TERMINAL APPARATUS 20B

| STA FUNCTION | FREQUENCY BAND | CHANNEL ID | LINK DESTINATION ID | MULTI-LINK | TID |
|---|---|---|---|---|---|
| STA1 (LINK #4) | 6GHz | CH2 | XX | O (ANCHOR) | #1,#2 |
| STA2 (LINK #5) | 5GHz | CH3 | XX | O | #1,#3 |
| STA3 (LINK #6) | 2.4GHz | CH3 | XX | O | #4 |

BASE STATION AND TERMINAL APPARATUS

CROSS-REFERENCE TO RELATED APPLICATIONS

This application is a 371 U.S. National Phase of International Application No. PCT/JP2020/038621, filed on Oct. 13, 2020. The entire disclosure of the above application is incorporated herein by reference.

TECHNICAL FIELD

Embodiments relate to a base station and a terminal apparatus.

BACKGROUND ART

A wireless Local Area Network (LAN) is known as a wireless system for wirelessly connecting a base station and a terminal apparatus.

CITATION LIST

Non Patent Literature

NPL 1: IEEE Std 802.11-2016, "9.3.3.3 Beacon Frame Format" and "11.1 Synchronization," 7 Dec. 2016

SUMMARY OF INVENTION

Technical Problem

It is desirable to improve a communication quality of a multi-link.

Means for Solution to Problem

A base station of an embodiment includes a first wireless signal processing unit, a second wireless signal processing unit, and a link management unit. The first wireless signal processing unit is configured to be able to transmit and receive a wireless signal using a first channel. The second wireless signal processing unit is configured to be able to transmit and receive a wireless signal using a second channel different from the first channel. The link management unit establishes a multi-link with a terminal apparatus by using the first wireless signal processing unit and the second wireless signal processing unit, and sets an anchor link to be used in transmission and reception of control information regarding an operation of the multi-link. The link management unit transmits a first wireless frame requesting change of the anchor link to the terminal apparatus by using the first wireless signal processing unit set to the anchor link, and changes the anchor link from the first wireless signal processing unit to the second wireless signal processing unit if either the first wireless signal processing unit or the second wireless signal processing unit receives a positive response from the terminal apparatus after the first wireless frame is transmitted.

Advantageous Effects of Invention

The base station of the embodiment can improve a communication quality of the multi-link.

BRIEF DESCRIPTION OF DRAWINGS

FIG. 9 is a table showing an example of link management information in the wireless system according to the embodiment.

FIG. 12 is a conceptual diagram illustrating an example of a beacon signal including multi-link capability information in the wireless system according to the embodiment.

FIG. 25 is a table showing combinations of link sets for a multi-link and settings of an anchor link used in the wireless system according to the modified example of the embodiment.

FIG. 26 is a table showing an example of link management information in a wireless system according to a first modified example of the embodiment.

FIG. 28 is a table showing an example of link management information in a wireless system according to a second modified example of the embodiment.

FIG. 31 is a table showing an example of link management information in a wireless system according to a third modified example of the embodiment.

FIG. 33 is a table showing an example of link management information in a wireless system according to a fourth modified example of the embodiment.

DESCRIPTION OF EMBODIMENTS

Figure 1:
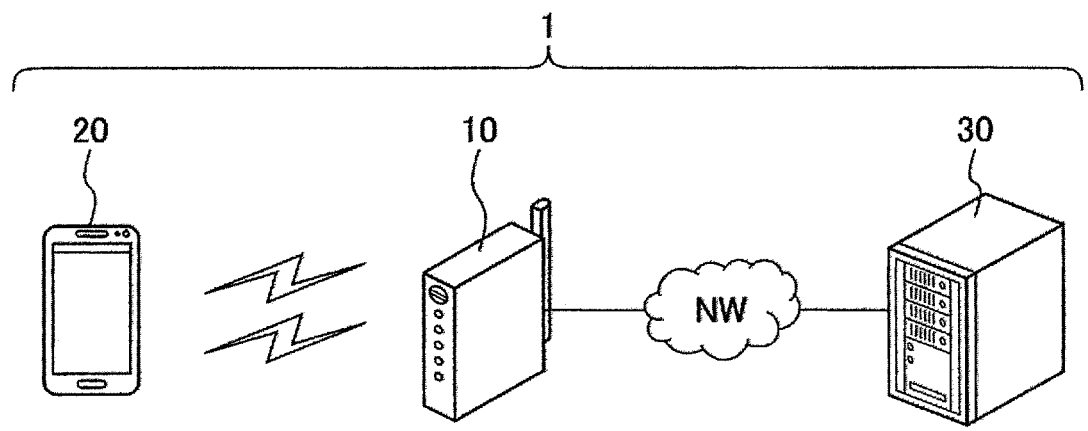
FIG. 1 is a conceptual diagram illustrating an example of an overall configuration of a wireless system according to an embodiment.

Hereinafter, a wireless system 1 according to an embodiment will be described with reference to the drawings. In the embodiment, a device or a method for embodying the technical idea of the invention will be exemplified. The drawings are schematic or conceptual. The dimensions, the ratios, and the like of the drawings are not necessarily the same as the actual ones. The technical idea of the present invention is not specified in accordance with the shapes, structures, disposition, and the like of constituent elements. In the following description, the same reference numerals are given to components having substantially the same function and configuration.

<1> Configuration of Wireless System 1

<1-1> Overall Configuration of Wireless System 1

FIG. 1 illustrates an example of a configuration of the wireless system 1 according to the embodiment. As illustrated in FIG. 1, the wireless system 1 includes, for example, a base station 10, a terminal apparatus 20, and a server 30.

The base station 10 is connected to a network NW and is used as an access point of a wireless LAN. For example, the base station 10 can deliver data received from the network NW to the terminal apparatus 20 wirelessly. The base station 10 can be connected to the terminal apparatus 20 using one type of band or a plurality of types of bands. In the present specification, a wireless connection between the base station 10 and the terminal apparatus 20 using a plurality of types of bands is referred to as a "multi-link". Communication between the base station 10 and the terminal apparatus 20 is based on, for example, the IEEE 802.11 standard.

The terminal apparatus 20 is, for example, a wireless terminal apparatus such as a smartphone or a tablet PC. The terminal apparatus 20 can transmit and receive data to and from the server 30 on the network NW via the wirelessly connected base station 10. The terminal apparatus 20 may be another electronic device such as a desktop computer or a laptop computer. The terminal apparatus 20 may be a device that can communicate with at least the base station 10 and can perform an operation to be described below.

The server 30 can retain various types of information and retains, for example, data of content for the terminal apparatus 20. The server 30 is connected to, for example, the network NW in a wired manner and is able to communicate with the base station 10 via the network NW. The server 30 may be able to communicate with at least the base station 10. That is, communication between the base station 10 and the server 30 may be wired or wireless communication.

Data communication between the base station 10 and the terminal apparatus 20 in the wireless system 1 according to the embodiment is based on an Open Systems Interconnection (OSI) reference model, of which communication functions are divided into seven layers (Layer 1: physical layer, Layer 2: data link layer, Layer 3: network layer, Layer 4: transport layer, Layer 5: session layer, Layer 6: presentation layer, and Layer 7: application layer).

The data link layer includes, for example, a logical link control (LLC) layer and a media access control (MAC) layer, and the LLC layer adds a Destination Service Access Point (DSAP) header, a Source Service Access Point (SSAP) header, and so forth to data input from a higher application, for example, thereby forming LLC packets. The MAC layer adds an MAC header to an LLC packet, for example, to form an MAC frame.

Frequency Bands Used for Wireless Communication

Figure 2:
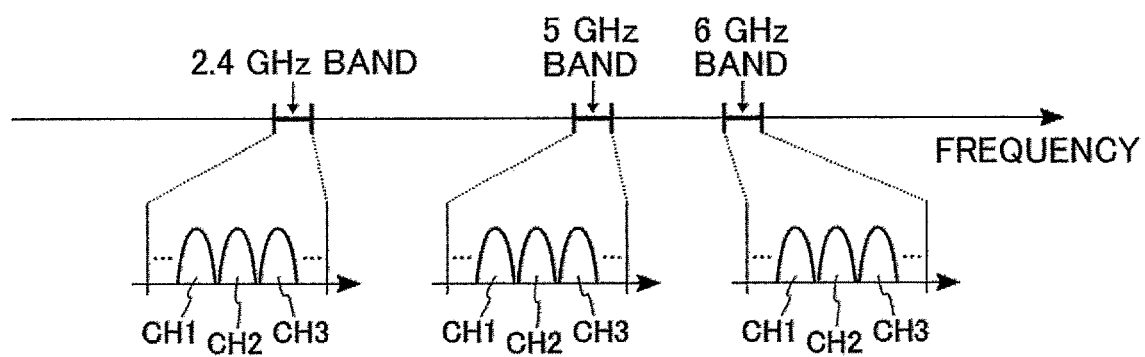
FIG. 2 is a conceptual diagram illustrating examples of frequency bands used for wireless communication in the wireless system according to the embodiment.

FIG. 2 illustrates examples of frequency bands used for wireless communication in the wireless system 1 according to the embodiment. As illustrated in FIG. 2, in wireless communication, for example, a 2.4 GHz band, a 5 GHz band, and a 6 GHz band are used. Furthermore, each frequency band includes a plurality of channels. In this example, each of the 2.4 GHz band, the 5 GHz band, and the 6 GHz band includes at least three channels CH1, CH2, and CH3. Communication in which each channel CH is used is realized by an STA function to be described below.

The wireless system 1 may use frequency bands other than the 2.4 GHz band, 5 GHz band, and 6 GHz band for wireless communication. At least one channel CH may be set in each frequency band. In a multi-link, the channels CH of the same frequency band may be used, or the channels CH of different frequency bands may be used.

Format of Wireless Frame

Figure 3:
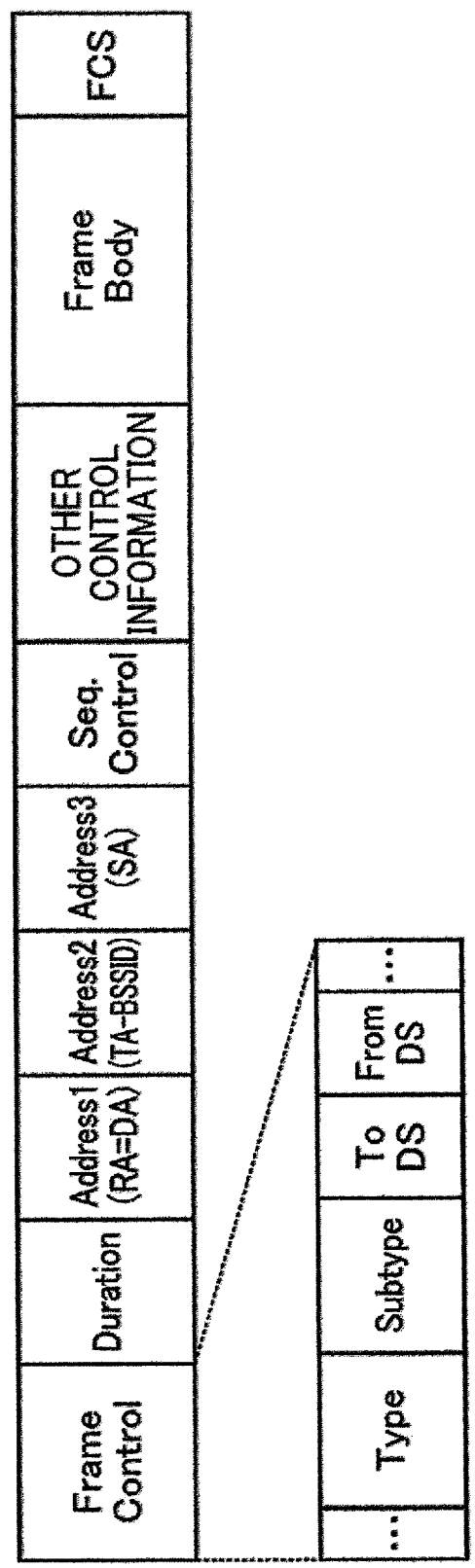
FIG. 3 is a conceptual diagram illustrating an example of the format of a wireless frame in the wireless system according to the embodiment.

FIG. 3 illustrates a specific example of a format of a wireless frame used in communication between the base station 10 and the terminal apparatus 20 in the wireless system 1 according to an embodiment, and as illustrated in FIG. 3, the wireless frame includes, for example, a Frame Control field, a Duration field, an Address1 field, an Address2 field, an Address3 field, a Sequence Control field, an other-control information field, a Frame Body field, and a Frame Check Sequence (FCS) field. These fields may or may not be included depending on the type of a wireless frame.

The Frame Control field to the other-control information field correspond to, for example, an MAC header included in an MAC frame. The Frame Body field corresponds to, for example, an MAC payload contained in the MAC frame. The FCS field stores an error detection code of the MAC header and the frame body field, and is used to determine the presence of an error in the wireless frame.

The Frame Control field indicates various types of control information and includes, for example, a Type value, a Subtype value, a To Distribution System (To DS) value, and a From DS value. The Type value indicates the frame type of the wireless frame. For example, the Type value "00" indicates that the wireless frame is a management frame. The Type value "01" indicates that the wireless frame is a control frame. The Type value "10" indicates that the wireless frame is a data frame.

The content of the wireless frame varies depending on the combination of the Type value and the SubType value. For example, "00/1000 (Type value/Subtype value)" indicates that the wireless frame is a beacon signal. The meaning of the to DS value and the from DS value differs depending on the combination thereof. For example, "00" (to DS/From DS)" indicates that the data is data between terminal apparatuses in the same Independent Basic Service Set (IBBS). "10" indicates that the data frame is directed to a Distribution System (DS) from the outside. "01" indicates that the data frame is to go out of the DS. "11" is used when forming a mesh network.

The Duration field indicates a scheduled period for using a radio channel. A plurality of Address fields indicate a BSSID, a transmission source address, a destination address, the address of a sender terminal apparatus, the address of the receiver terminal apparatus, and the like. The Sequence Control field indicates a sequence number of the MAC frame and a fragment number for a fragment. The other-control information field includes, for example, traffic type (TID) information. The TID information may be inserted at another position in the wireless frame. The Frame Body field includes information corresponding to the type of the frame. For example, the Frame Body field stores data when it corresponds to a data frame.

<1-2> Configuration of Base Station 10

Figure 4:
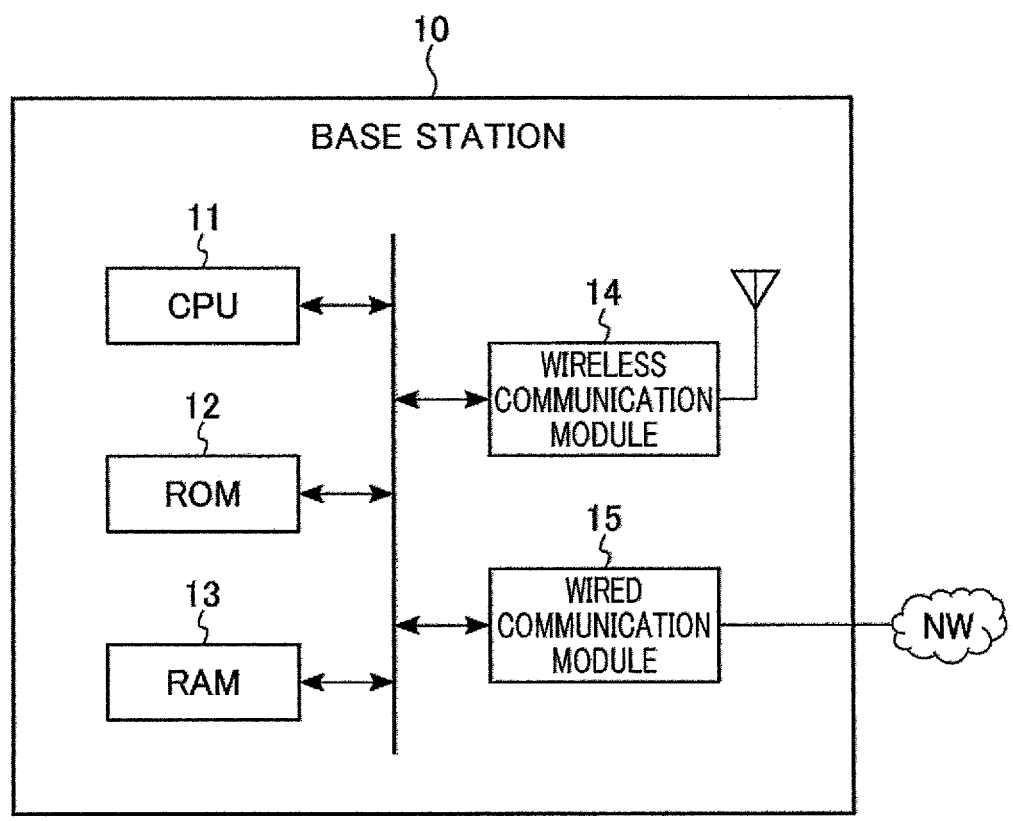
FIG. 4 is a block diagram illustrating an example of a configuration of a base station included in the wireless system according to the embodiment.

FIG. 4 illustrates an example of a configuration of the base station 10 included in the wireless system 1 according to an embodiment. as illustrated in FIG. 4, the base station 10 includes, for example, a central processing unit (CPU) 11, a read-only memory (ROM) 12, a random access memory (RAM) 13, a wireless communication module 14, and a wired communication module 15.

The CPU 11 is a circuit capable of executing various programs, and controls overall operations of the base station 10. The ROM 12 is a nonvolatile semiconductor memory and retains a program, control data, and the like for controlling the base station 10. The RAM 13 is, for example, a volatile semiconductor memory and is used as a working area of the CPU 11. The wireless communication module 14 is a circuit used to transmit and receive data using a wireless signal and is connected to an antenna. The wireless communication module 14 includes, for example, a plurality of communication modules respectively corresponding to a plurality of frequency bands. The wired communication module 15 is a circuit used to transmit and receive data using a wired signal and is connected to the network NW.

Figure 5:
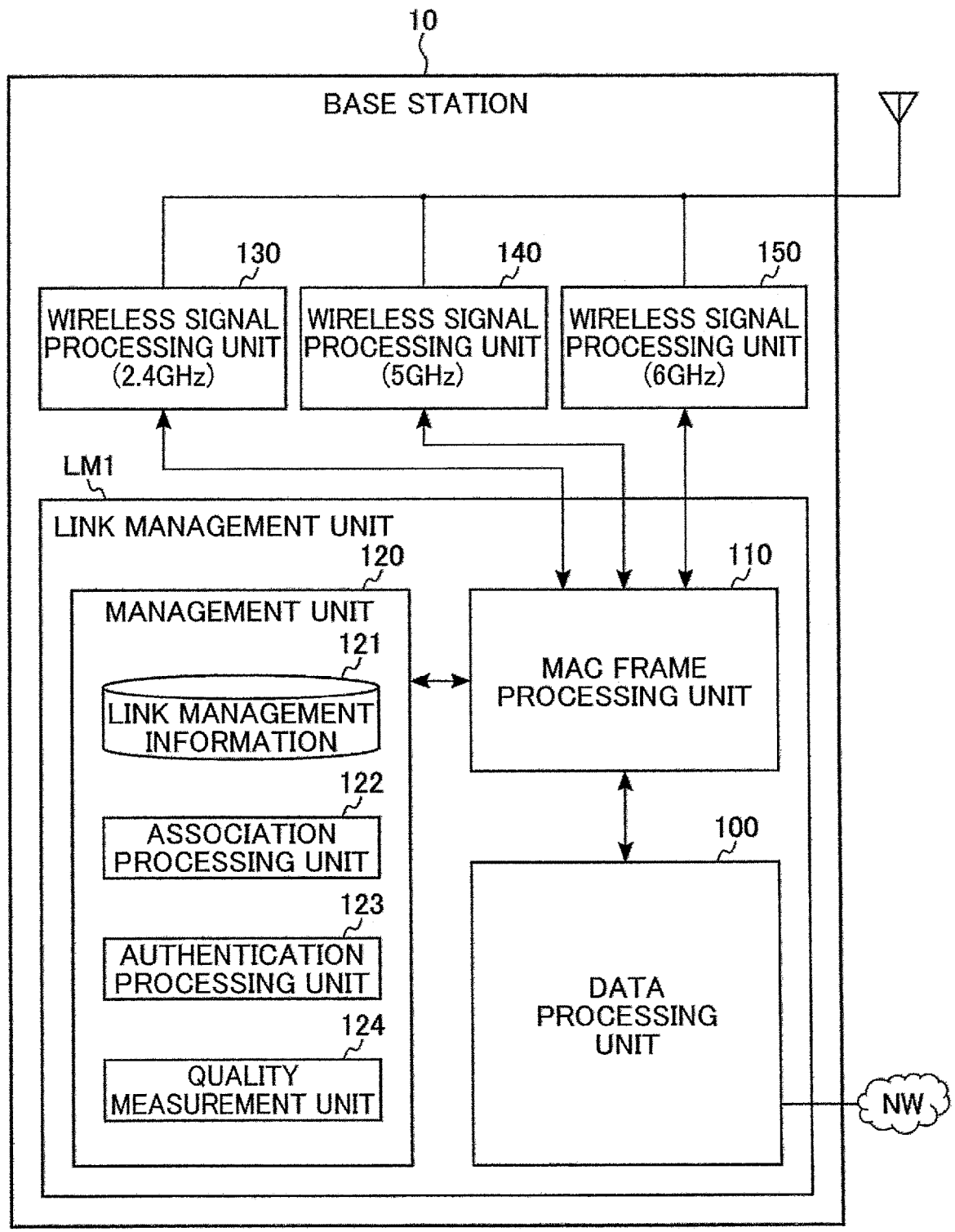
FIG. 5 is a block diagram illustrating an example of functions of the base station included in the wireless system according to the embodiment.

FIG. 5 illustrates an example of a functional configuration of the base station 10 included in the wireless system 1 according to the embodiment. As illustrated in FIG. 5, the base station 10 includes, for example, a data processing unit 100, an MAC frame processing unit 110, a management unit 120, and wireless signal processing units 130, 140, and 150. Processing of the data processing unit 100, the MAC frame processing unit 110, the management unit 120, and the wireless signal processing units 130, 140, and 150 is realized by, for example, the CPU 11 and the wireless communication module 14.

The data processing unit 100 can execute the processing of the LLC layer and the processing of the upper layer on input data. For example, the data processing unit 100 outputs the data input from the server 30 via the network NW to the MAC frame processing unit 110. Also, the data processing unit 100 transmits the data input from the MAC frame processing unit 110 to the server 30 via the network NW.

The MAC frame processing unit 110 performs, for example, some of the processing of the MAC layer on the input data. For example, the MAC frame processing unit 110 generates an MAC frame from data input from the data processing unit 100. The MAC frame generation unit 110 restores data from MAC frames input from each of the wireless signal processing units 130, 140, and 150. The processing of generating the MAC frame from the data and the processing of restoring the data from the MAC frame are performed, for example, based on the IEEE 802.11 standard.

The management unit 120 manages a link with the terminal apparatus 20 based on notifications received from the wireless signal processing units 130, 140, and 150 via the MAC frame processing unit 110. The management unit 120 includes link management information 121. The link management information 121 is stored in, for example, the RAM 13, and includes information of the terminal apparatus 20 that is wirelessly connected to the base station 10. Also, the management unit 120 includes an association processing unit 122 and an authentication processing unit 123, and a quality measurement unit 124. When the association processing unit 122 receives a connection request of the terminal apparatus 20 via one of the wireless signal processing units 130, 140, and 150, the association processing unit 122 executes a protocol related to the association. The authentication processing unit 123 executes a protocol related to authentication in succession to the connection request. The quality measurement unit 124 periodically measures and evaluates a communication quality of each channel. In addition, the quality measurement unit 124 periodically requests the terminal apparatus 20 to measure and report a communication quality. Hereinafter, a set of the data processing unit 100, the MAC frame processing unit 110, and the management unit 120 is referred to as a link management unit LM1 of the base station 10.

Each of the wireless signal processing units 130, 140 and 150 transmits and receives data between the base station 10 and the terminal apparatus 20 by using wireless communication. For example, each of the wireless signal processing units 130, 140 and 150 adds a preamble, a PHY header, and the like to data input from the MAC frame processing unit 110 to create a wireless frame. Then, each of the wireless signal processing units 130, 140, and 150 converts the wireless frame into a wireless signal and distributes the wireless signal via an antenna of the base station 10. In addition, each of the wireless signal processing units 130, 140 and 150 converts the wireless signal received via the antenna of the base station 10 into a wireless frame. Then, each of the wireless signal processing units 130, 140 and 150 outputs data (for example, an MAC frame) included in the wireless frame to the MAC frame processing unit 110.

In this way, each of the wireless signal processing units 130, 140, and 150 can perform, for example, some of the processing of the MAC layer and the processing of the first layer on the input data or the wireless signal. The wireless signal processing unit 130 handles wireless signals in the 2.4 GHz band. The wireless signal processing unit 140 handles wireless signals in the 5 GHz band. The wireless signal processing unit 150 handles wireless signals of the 6 GHz band. The wireless signal processing units 130, 140, and 150 may or may not share the antenna of the base station 10.

<1-3> Configuration of Terminal Apparatus 20

Figure 6:
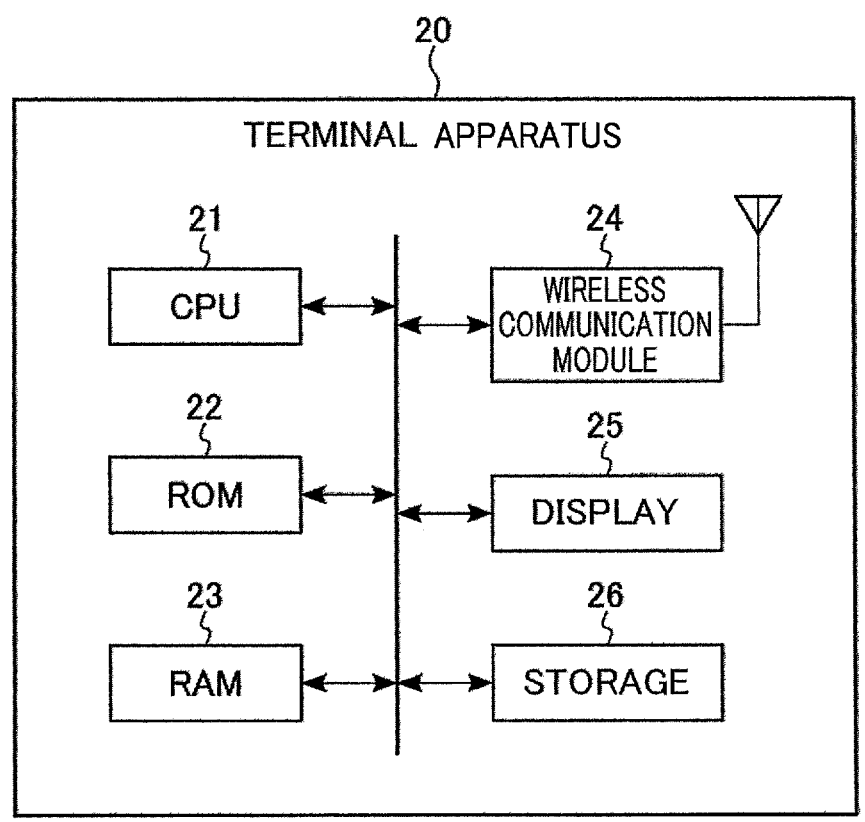
FIG. 6 is a block diagram illustrating an example of a configuration of a terminal apparatus included in the wireless system according to the embodiment.

FIG. 6 illustrates an example of a configuration of the terminal apparatus 20 included in the wireless system 1 according to the embodiment. As illustrated in FIG. 6, the terminal apparatus 20 includes, for example, a CPU 21, a ROM 22, a RAM 23, a wireless communication module 24, a display 25, and a storage 26.

The CPU 21 is a circuit capable of executing various programs and controls the entire operations of the terminal apparatus 20. The ROM 22 is a nonvolatile semiconductor memory and retains a program, control data, and the like for controlling the terminal apparatus 20. The RAM 23 is, for example, a volatile semiconductor memory and is used as a work area of the CPU 21. The wireless communication module 24 is a circuit used for transmitting and receiving data using a wireless signal, and is connected to an antenna. The wireless communication module 24 includes a plurality of communication modules corresponding to a plurality of frequency bands. The display 25 displays, for example, a graphical user interface (GUI) corresponding to application software. The display 25 may include a function of an input interface of the terminal apparatus 20. The storage 26 is a nonvolatile storage device and retains, for example, system software or the like of the terminal apparatus 20. The terminal apparatus 20 may not include a display. For example, the display 25 can be omitted in an IoT terminal apparatus.

Figure 7:
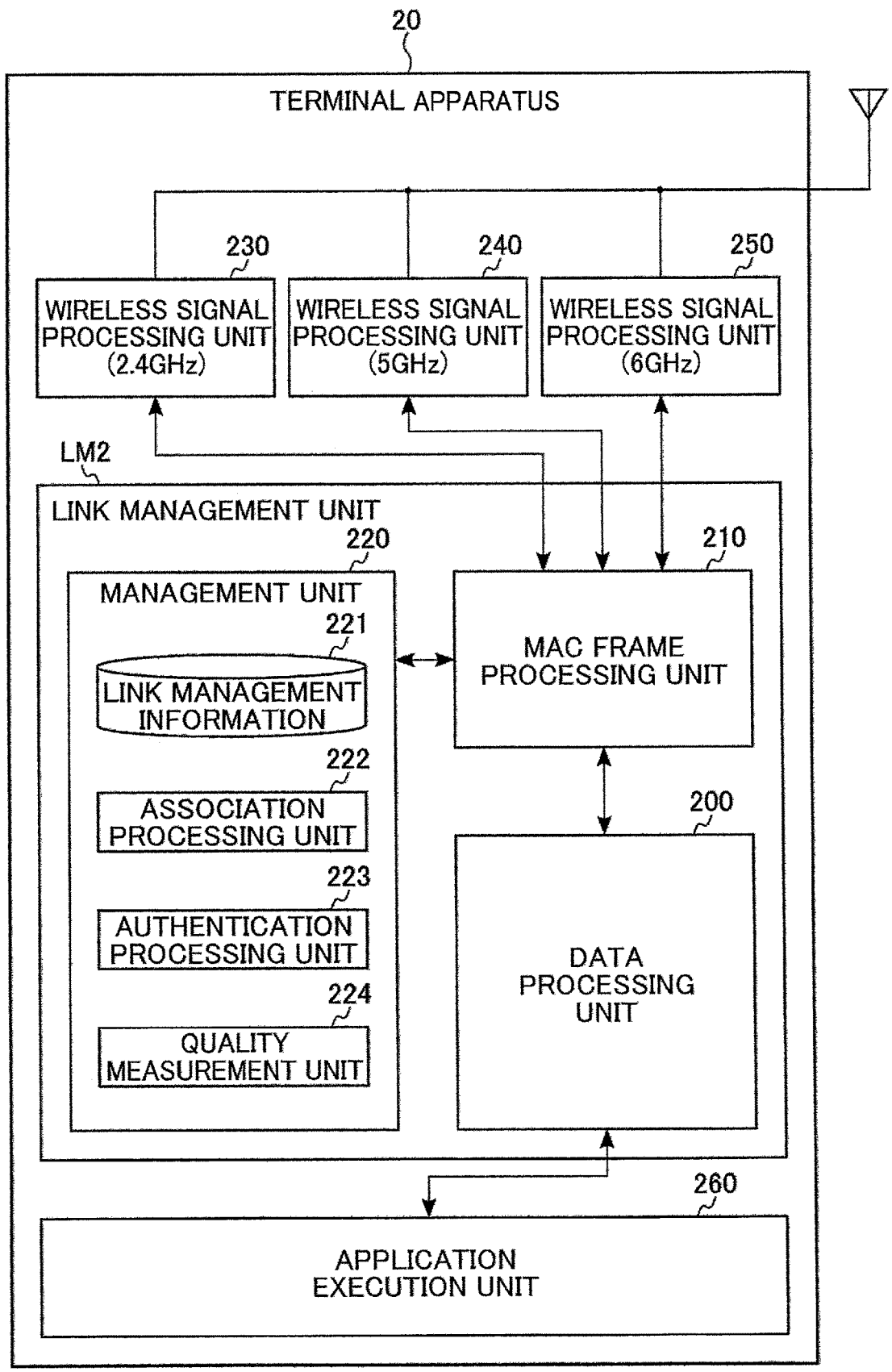
FIG. 7 is a block diagram illustrating an example of functions of the terminal apparatus included in the wireless system according to the embodiment.

FIG. 7 illustrates an example of a functional configuration of the terminal apparatus 20 included in the wireless system 1 according to the embodiment. As illustrated in FIG. 7, the terminal apparatus 20 includes, for example, a data processing unit 200, an MAC frame processing unit 210, a management unit 220, wireless signal processing units 230, 240, and 250, and an application execution unit 260. Processing of the data processing unit 200, the MAC frame processing unit 210, the management unit 220, and the wireless signal processing units 230, 240, and 250 is realized by, for example, the CPU 21 and the wireless communication module 24. Processing of the application execution unit 260 is realized by, for example, the CPU 21.

The data processing unit 200 can perform processing of the LLC layer and processing of the higher layers (the third to seventh layers) on input data. For example, the data processing unit 200 outputs the data input from the application execution unit 260 to the MAC frame processing unit 210. Also, the data processing unit 200 outputs the data input from the MAC frame processing unit 210 to the application execution unit 260.

The MAC frame processing unit 210 performs, for example, some of the processing of the MAC layer on the input data. For example, the MAC frame processing unit 210 generates an MAC frame from data input from the data processing unit 200. In addition, the MAC frame processing unit 210 restores data from MAC frames input from each of the wireless signal processing units 230, 240, and 250. The processing of generating the MAC frame from the data and the processing of restoring the data from the MAC frame are performed, for example, based on the IEEE 802.11 standard.

The management unit 220 manages a link with the base station 10 based on notifications received from the wireless signal processing units 230, 240, and 250 via the MAC frame processing unit 210. The management unit 220 includes link management information 221. The link management information 221 is stored in, for example, the RAM 23 and includes information regarding the base station 10 wirelessly connected to the terminal apparatus 20. Also, the management unit 220 includes an association processing unit 222 and an authentication processing unit 223, and a quality measurement unit 224. When the association processing unit 222 receives a connection request of the base station 10 via one of the wireless signal processing units 230, 240, and 250, the association processing unit 222 executes a protocol related to association. The authentication processing unit 223 executes a protocol related to authentication following the connection request. The quality measurement unit 224 periodically measures and evaluates a communication quality of each channel. In addition, in response to a request for measurement and notification of a communication quality received from the base station 10, the quality measurement unit 224 measures a communication quality by each STA function, and notifies the base station 10 of a measurement result. Hereinafter, a set of the data processing unit 200, the MAC frame processing unit 210, and the management unit 220 is referred to as a link management unit LM2 of the terminal apparatus 20.

Each of the wireless signal processing units 230, 240 and 250 transmits and receives data between the base station 10 and the terminal apparatus 20 by using wireless communication. For example, each of the wireless signal processing units 230, 240 and 250 adds a preamble, a PHY header, and the like to data input from the MAC frame processing unit 210 to create a wireless frame. Then, each of the wireless signal processing units 230, 240, and 250 converts the wireless frame into a wireless signal and distributes the wireless signal via an antenna of the terminal apparatus 20. In addition, each of the wireless signal processing units 230, 240 and 250 converts the wireless signal received via the antenna of the terminal apparatus 20 into a wireless frame. Then, each of the wireless signal processing units 230, 240 and 250 outputs data (for example, an MAC frame) included in the wireless frame to the MAC frame processing unit 210.

Each of the wireless signal processing units 230, 240, and 250 can execute, for example, some of the processing of the MAC layer and the processing of the first layer on the input data or the wireless signal. The wireless signal processing unit 230 handles wireless signals in the 2.4 GHz band. The wireless signal processing unit 240 handles wireless signals in the 5 GHz band. The wireless signal processing unit 250 handles wireless signals in the 6 GHz band. The wireless signal processing units 230, 240, and 250 may or may not share the antenna of the terminal apparatus 20.

The application execution unit 260 performs an application which can use the data input from the data processing unit 210. For example, the application execution unit 260 can display information regarding the application on the display 25. In addition, the application execution unit 260 can work based on an operation of the input interface.

In the wireless system 1 according to the embodiment described above, the wireless signal processing units 130, 140, and 150 of the base station 10 can be connected to the wireless signal processing units 230, 240, and 250 of the terminal apparatus 20, respectively. That is, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be connected wirelessly using the 6 GHz band. In the present specification, each wireless signal processing unit may be referred to as an "STA function". That is, the wireless system 1 according to the embodiment includes a plurality of STA functions.

<1-4> Link Management Unit LM1

Figure 8:
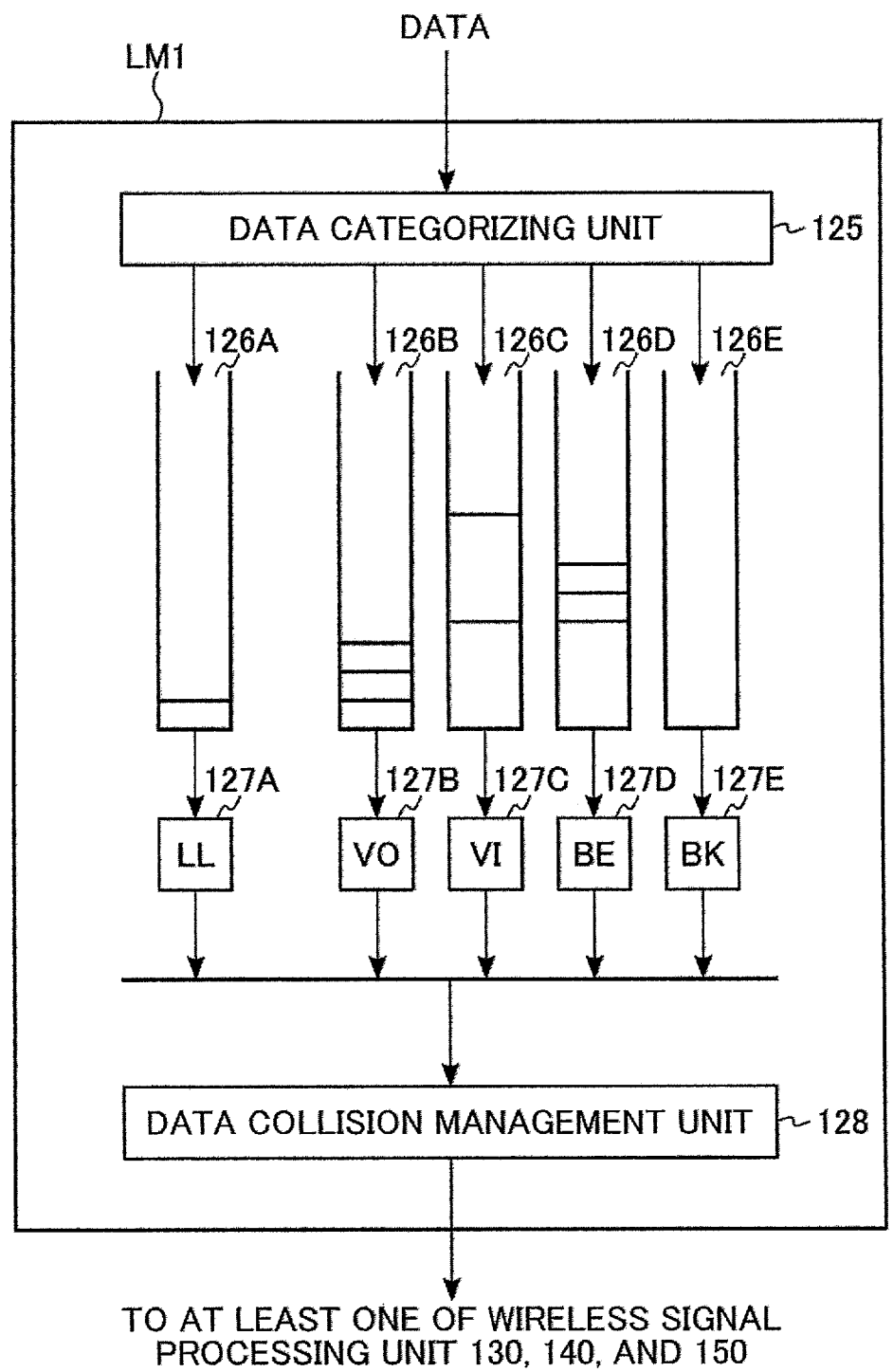
FIG. 8 is a block diagram illustrating an example of a detailed function of a link management unit of the base station included in the wireless system according to the embodiment.

FIG. 8 illustrates details of a channel access function of the link management unit LM1 of the base station 10 included in the wireless system 1 according to the embodiment. Because the function of the link management unit LM2 of the terminal apparatus 20 is similar to that of the link management unit LM1 of the base station 10, description thereof will be omitted. As illustrated in FIG. 8, the link management unit LM1 includes, for example, a data categorizing unit 125, transmission queues 126A, 126B, 126C, 126D, and 126E, carrier sense multiple access with collision avoidance (CSMA/CA) execution units 127A, 127B, 127C, 127D and 127E, and a data collision management unit 128.

The data categorizing unit 125 categorizes data input from the data processing unit 100. As the data category, for example, "Low Latency (LL)", "Voice (VO)", "Video (VI)", "Best Effort (BE)", and "Background (BK)" are set. The LL is applied to data that requires a low latency. For this reason, data of LL is preferably processed preferentially to data of any of VO, VI, BE and BK data.

In addition, the data categorizing unit 125 inputs the categorized data to one of the transmission queues 126A, 126B, 126C, 126D, and 126E. Specifically, data of LL is inputted to the transmission queue 126A. Data of VO is inputted to the transmission queue 126B. Data of VI is inputted to the transmission queue 126C. Data of BE is inputted to the transmission queue 126D. Data of BK is inputted to the transmission queue 126E. Then, the input data of each category is accumulated in one of the corresponding transmission queues 126A to 126E.

Each of the CSMA/CA execution units 127A, 127B, 127C, 127D and 127E waits for transmission only for a time specified by a preset access parameter while confirming that there is no transmission of a wireless signal by another terminal apparatus or the like by carrier sense in CSMA/CA. Then, CSMA/CA execution units 127A, 127B, 127C, 127D and 127E extract data from each of the transmission queues 126A, 126B, 126C, 126D, and 126E, respectively, and output the extracted data to at least one of the wireless signal processing units 130, 140 and 150 via the data collision management unit 128. Then, a wireless signal including the data is transmitted by the wireless signal processing units (STA function) in which the transmission right is acquired by CSMA/CA.

The CSMA/CA execution unit 127A performs CSMA/CA for data of the LL retained in the transmission queue 126A. The CSMA/CA execution unit 127B performs CSMA/CA for data of the VO retained in the transmission queue 126B. The CSMA/CA execution unit 127C performs CSMA/CA for data of the VI retained in the transmission queue 126C. The CSMA/CA execution unit 127D performs CSMA/CA for data of the BE retained in the transmission queue 126D. The CSMA/CA execution unit 127E performs CSMA/CA for data of the BK retained in the transmission queue 126E.

Access parameters are allocated to prioritize transmission of wireless signals in order of, for example, LL, VO, VI, BK, and BK. The access parameters include, for example, CWmin, CWmax, AIFS, and TXOPLimit. CWmin and CWmax indicate the minimum value and the maximum value of the contention window, which is the time for waiting for transmission for avoiding collision, respectively. Arbitration Inter Frame Space (AIFS) indicates a fixed transmission waiting time set for each access category for collision avoidance control provided with a priority control function. TXOPLimit indicates the upper limit value of a Transmission Opportunity (TXOP) corresponding to the occupied time of the channel. For example, the transmission queues 126 can obtain the transmission right more easily as CWmin and CWmax are shorter. The smaller the AIFS is, the higher the priority of the transmission queues 126 is. The amount of data transmitted with one transmission right increases as the value of TXOPLimit increases.

When the plurality of CSMA/CA execution units 127 obtain the transmission rights with the same STA function, the data collision management unit 128 prevents data collisions. Specifically, the data collision management unit 128 adjusts transmission timings of data in which the transmission right is obtained with the same STA function and different categories and transmits the data of the category with higher priority to the STA function. For example, the STA function obtaining the transmission right by CSMA/CA of the transmission queue 126A of LL may gain the transmission right at the same time as the STA function obtaining the transmission right by CSMA/CA of one of the other transmission queues 126B to 126E. In this case, the data collision management unit 128 preferentially transmits the data stored in the transmission queue 126A to the STA function. In combinations of the other transmission queues 126, the data is transmitted similarly in order which is based on the priority set in the categories. Thus, collision of data for which transmission is allocated to the same STA function is prevented.

Although the mode in which the link management units LM1 and LM2 implement the channel access function has been described in the embodiment, each STA function may implement the channel access function. When the link management units LM1 and LM2 implement the channel access function, each STA function detects a state (idle/busy) of a wireless channel in a corresponding link, and the link management units LM1 and LM2 determine whether to transmit data (which link is used for transmission, etc.). On the other hand, when each STA function implements a channel access function, each STA function may independently execute carrier sensing to transmit data. At this time, channel access in a case in which a plurality of links are simultaneously used may be performed by exchanging the access parameters between the plurality of STA functions and using the access parameters in common, or may be performed by using the access parameters in common by the link management units LM1 and LM2. The base station 10 and the terminal apparatus 20 can simultaneously use a plurality of links by transmitting data based on the access parameters common to the plurality of STA functions.

<1-5> Link Management Information 121

FIG. 9 illustrates an example of the link management information 121 in the wireless system 1 according to the embodiment. Since the link management information 221 of the terminal apparatus 20 has information similar to the link management information 121 of the base station 10, description thereof will be omitted. As illustrated in FIG. 9, the link management information 121 includes, for example, information regarding the STA functions, frequency bands, channel IDs, link destination IDs, multi-links, and TIDs.

In this example, "STA1" corresponds to the STA function using the 6-GHz frequency band, that is, the wireless signal processing unit 150 or 250. "STA2" corresponds to the STA function using the 5-GHz frequency band, that is, the wireless signal processing unit 140 or 240. "STA3" corresponds to the STA function using the 2.4-GHz frequency band, that is, the wireless signal processing unit 130 or 230. Hereinafter, STA1, STA2 and STA3 are also referred to as link #1, link #2 and link #3, respectively.

The channel ID corresponds to an identifier of a channel used in a set frequency band. The link destination ID corresponds to the identifier of the terminal apparatus 20 in the link management information 121 and corresponds to the identifier of the base station 10 in the link management information 221. In this example, multi-links using STA1, STA2 and STA3 are established. When the multi-links are established, the link management units LM1 and LM2 each transmit data input from a higher layer using a link of at least one STA function associated with the multi-links.

The base station 10 sets one STA function among the plurality of STA functions as an anchor link. In this example, STA1 is set as an anchor link. The anchor link is set by the link management unit LM1 of the base station 10. The anchor link transmits and receives control information regarding an operation of the multi-links in addition to the transmission and reception of assigned data. Combinations of links constituting the multi-links may differ between the plurality of terminal apparatuses 20, each of which establishing the multi-links with the base station 10.

"TID" in the link management information 121 indicates an association of an STA function with TID information. Each STA function transmits and receives data corresponding to allocated TID information. For example, each of TID #1 to #4 corresponds to one of LL, VO, VI, BE, and BK. One STA function or a plurality of STA functions may be associated with one type of traffic, that is, one piece of TID information In this example, TID #1 is allocated to both STA1 and STA2. TID #2 is allocated to STA1. TID #3 is allocated to STA2. TID #4 is allocated to STA3.

A traffic flow corresponding to the association of such traffic and STA function is preset when the multi-links between the base station 10 and the terminal apparatus 20 are set up. For example, the link management unit LM2 of the terminal apparatus 20 determines the association of the traffic with the STA functions, and sends a request to the link management unit LM1 of the base station 10. Then, the base station 10 confirms the association of the traffic with the STA functions by sending a response to the request.

Traffic is set to be uniform in a plurality of links constituting the multi-links, for example. The present invention is not limited thereto, and similar types of traffic (priority/non-priority, or the like) may be collected in one link constituting the multi-links. In addition, as the association of the STA functions with the traffic, there is, for example, association of a sound with the frequency band of 2.4 GHz, and association of a video with 5G. In this way, it is preferable to allocate a frequency used for transmission and reception in accordance with the type of information to be handled and a data capacity.

<2> Operation of Wireless System 1

Hereinafter, examples of various operations related to multi-links in the wireless system 1 according to the embodiment will be described. In the following description, in order to simplify the description, STA1, STA2 and STA3 of the base station 10 are also referred to as "access points AP." Transmission of wireless signals to the access point AP by STA1, STA2, and STA3 of the terminal apparatus 20 corresponds to transmission of wireless signals to STA1, STA2 and STA3 of the base station 10, respectively. When STA1, STA2 and STA3 are individually described, they indicate the STA function of the terminal apparatus 20.

<2-1> Multi-Link Processing

Figure 10:
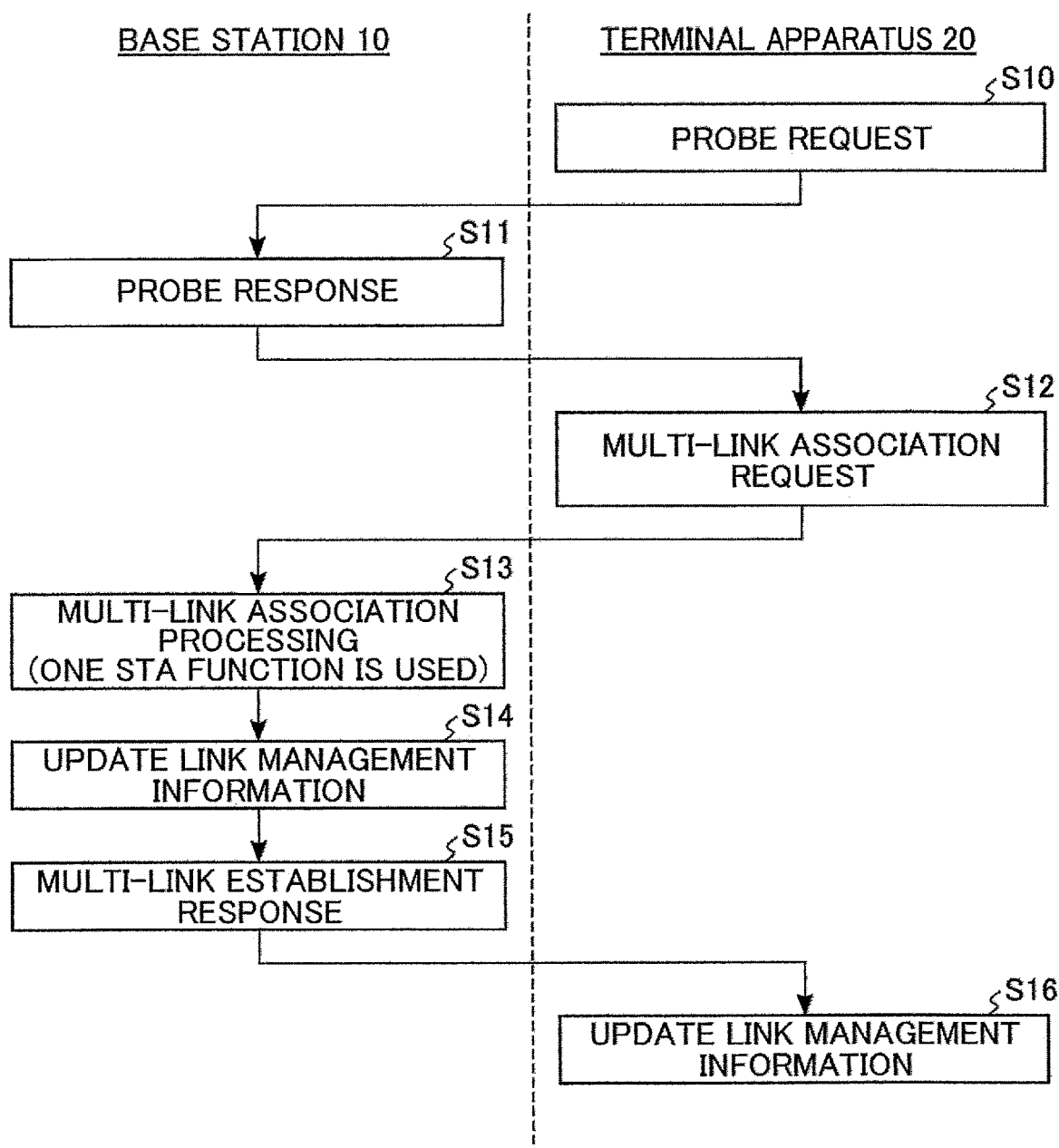
FIG. 10 is a flowchart showing an example of multi-link processing in the wireless system according to the embodiment.

FIG. 10 illustrates an example of a flow of the multi-link processing in the wireless system 1 according to the embodiment. As illustrated in FIG. 10, for example, the processing of steps S10 to S16 is executed sequentially in the multi-link processing. Hereinafter, the processing of steps S10 to S16 will be described exemplifying a case in which a multi-link is formed using three STA functions.

In the processing of the step S10, the terminal apparatus 20 transmits a probe request to the base station 10. The probe request is a signal for confirming whether the base station 10 exists around the terminal apparatus 20. The Frame Control field of the probe request includes, for example, "00/0100 (Type value/Subtype value)". Upon receiving the probe request, the base station 10 executes the processing of step S11.

In the processing of the step S11, the base station 10 transmits a probe response to the terminal apparatus 20. The probe response is a signal used by the base station 10 in response to the probe request from the terminal apparatus 20. The Frame Control field of the probe response includes, for example, "00/0101 (Type value/Subtype value)". Upon receiving the probe response, the terminal apparatus 20 executes the processing of step S12.

In the processing of the step S12, the terminal apparatus 20 transmits a multi-link association request to the base station 10 via at least one STA function. The multi-link association request is a signal for requesting the base station 10 to establish a multi-link. For example, a multi-link association request is generated by the link management unit LM2 of the terminal apparatus 20. The Frame Control field of the multi-link association request includes, for example, "00/xxxx (Type value/Subtype value (xxxx is a predetermined numerical value))". Upon receiving the multi-link association request, the link management unit LM1 of the base station 10 executes the processing of step S13.

In the processing of step S13, the link management unit LM1 of the base station 10 executes multi-link association processing using one STA function. Specifically, first, the base station 10 executes association processing of the STA function with the terminal apparatus 20. Then, when the wireless connection (link) is established in the first STA function, the link management unit LM1 of the base station 10 uses the first STA function to which the link is established to perform association processing of a second STA function and association processing of a third STA function. That is, the STA function to which the link is established is used for association processing of an STA function to which no link is established. When association processing of at least two STA functions is completed, the base station 10 establishes a multi-link and performs the processing of step S14.

In the processing of step S14, the link management unit LM1 of the base station 10 updates the link management information 121. Although the processing of step S14 is executed after two links are established in this example, the link management information 121 may be updated each time the link state is updated, or may be updated when a multi-link is established. When a multi-link is established and the link management information is updated, the base station 10 performs the processing of step S15.

In the processing of the step S15, the base station 10 transmits a multi-link establishment response to the terminal apparatus 20. The multi-link establishment response is a signal used by the base station 10 for a response to a multi-link request from the terminal apparatus 20. The Frame Control field of the multi-link association request includes, for example, "00/0001 (Type value/Subtype value)". The link management unit LM2 of the terminal apparatus 20 recognizes that the multi-link to the base station 10 has been established based on the fact that the multi-link establishment response was received. Upon receiving the multi-link establishment response, the terminal apparatus 20 executes the processing of step S16.

In the processing of step S16, the link management unit LM2 of the terminal apparatus 20 updates the link management information 221. That is, the terminal apparatus 20 records the fact that the multi-link to the base station 10 has been established in the link management information 221. Thus, the multi-link processing in the wireless system 1 according to the embodiment is completed, and data communication in which the multi-link is used is enabled between the base station 10 and the terminal apparatus 20.

The wireless system 1 according to the embodiment may establish a multi-link when a link is established in the first STA function. In this case, the terminal apparatus 20 receives a beacon signal related to the multi-link from the base station 10 prior to the multi-link association request in step S12. This operation will be described below with reference to FIGS. 11 and 12.

Figure 11:
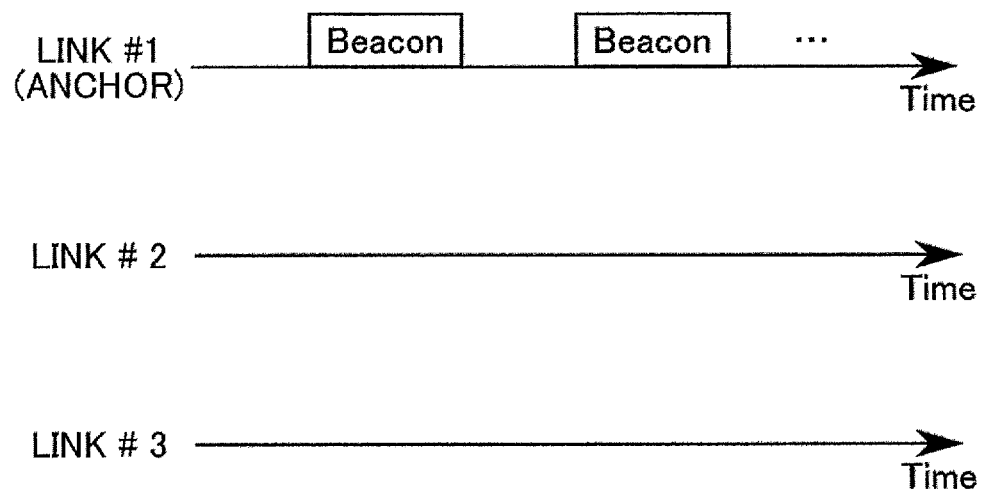
FIG. 11 is a conceptual diagram illustrating an example of a method of the base station to output a beacon signal in the wireless system according to the embodiment.

FIG. 11 illustrates an example of a method of the base station 10 to output a beacon signal in the wireless system 1 according to the embodiment. In this example, among links #1 to #3, link #1 is set as an anchor link. As illustrated in FIG. 11, the base station 10 intermittently transmits beacon signals using link #1 set as an anchor link. Conversely, transmission of beacon signals from links #2 and #3 which are not set as the anchor links is omitted. The beacon signal may be transmitted using a link that is not set as an anchor link, and may be transmitted using at least an anchor link.

FIG. 12 illustrates a specific example of a beacon signal including multi-link capability information in the wireless system 1 according to the embodiment. As illustrated in FIG. 12, the beacon signal includes, for example, multi-link capability information, operational information of link #1, operational information of link #2, and operational information of link #3.The information is generated by the link management unit LM1 of the base station 10.

The multi-link capability information indicates whether the base station 10 is able to perform a multi-link. For example, when the multi-link capability information is "0", it indicates that a multi-link is not possible. When the multi-link capability information is "1", it indicates that a multi-link is possible. The operational information of the link (an operational parameter) indicates a parameter for performing data transmission or the like in the link which can be used as a multi-link. For example, the operational information of link #1 indicates an access parameter of Enhanced Distributed Channel Access for performing transmission control in the link, or the like.

When the beacon signal described with reference to FIG. 12 is received, the terminal apparatus 20 checks the multi-link capability information and the operational information of each link targeted for a multi-link from the beacon signal. Then, the link management unit LM2 of the terminal apparatus 20 notifies the link management unit LM1 of the base station 10 of information regarding a link or the like targeted for a multi-link at the time of a multi-link association request. Thus, the link management unit LM1 of the base station 10 can collectively perform the association of the plurality of links specified by the link management unit LM2 of the terminal apparatus 20 and establish a multi-link to the terminal apparatus 20.

When the above-described beacon signal is transmitted only in the anchor link, the beacon signal may not have a field indicating the anchor link. On the other hand, when the beacon signal is transmitted in the anchor link and another link, the beacon signal may have a field indicating the anchor link or a field indicating the other links. Further, the base station 10 may add information included in the above-described beacon signal to the probe response. In this case, the link management unit LM2 of the terminal apparatus 20 can transmit a multi-link association request specifying a link to be used to the base station 10 without receiving the beacon signal. In addition, the base station 10 and the terminal apparatus 20 may perform an authentication process when the multi-links are established.

<2-2> Data Transmission During Multi-Link

Figure 13:
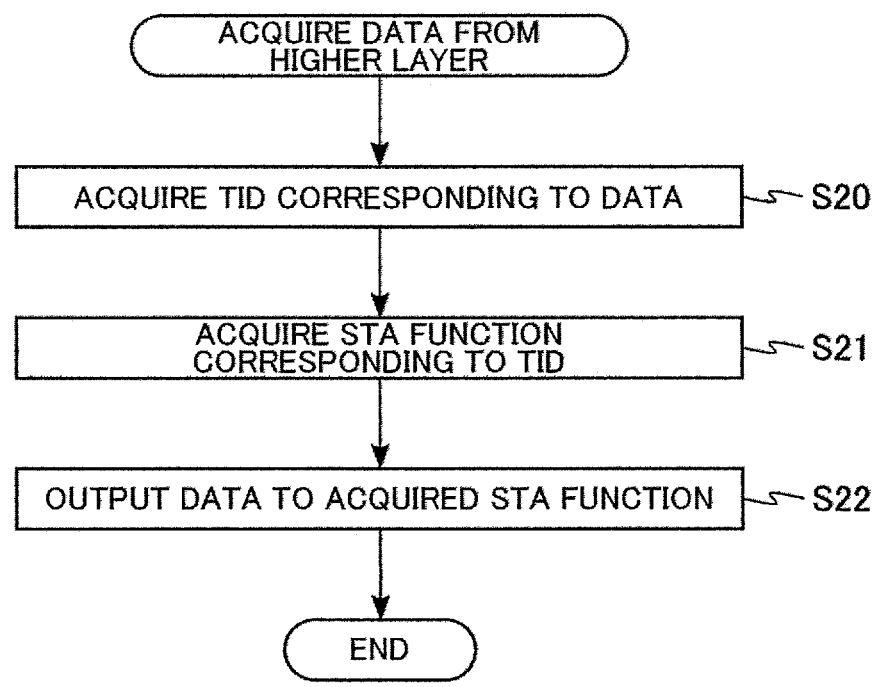
FIG. 13 is a flowchart showing an example of a method of transmitting data during a multi-link in the wireless system according to the embodiment.

FIG. 13 illustrates an example of a method of the base station 10 to transmit data during a multi-link in the wireless system 1 according to the embodiment. As illustrated in FIG. 13, the base station 10 sequentially performs processing of steps S20 to S22 when data is acquired from a higher layer. Hereinafter, the processing of steps S20 to S22 will be described.

In the processing of step S20, the link management unit LM1 acquires TID information corresponding to the data. In other words, the link management unit LM1 associates the data acquired from the higher layer with the TID with reference to, for example, control information such as a header added to the data.

In the processing of step S21, the link management unit LM1 acquires an STA function corresponding to the checked TID information. At this time, the link management unit LM1 checks the association of the TID information with the STA function with reference to the link management information 121. In the processing of step S21, the number of STA functions acquired by the link management unit LM1 may be one or more.

In the processing of step S22, the link management unit LM1 outputs the data to the acquired STA function. When one STA function is associated with the data (traffic) to be output, the data is transmitted in series using one STA function. On the other hand, when a plurality of STA functions are associated with the traffic, the data is transmitted in parallel using the plurality of STA functions.

When one type of traffic is transmitted in parallel, the data is distributed and sorted between the link management unit LM1 of the base station 10 and the link management unit LM2 of the terminal apparatus 20. The distribution of the data is performed by the link management unit LM of the transmission side, and the sorting of the data is performed by the link management unit LM of the reception side. For example, the link management unit LM of the transmission side adds a flag indicating a multi-link and an identification number to the wireless frame. The link management unit LM of the reception side performs the sorting of the data based on the added flag and identification number.

In addition, in the wireless system 1 according to the embodiment, when a plurality pieces of data is received from the higher layer, the link management unit LM may perform aggregation by combining the plurality pieces of received data. The aggregation in the multi-links may be used as an optional function of which execution or non-execution can be selected by a user.

<2-3> Multi-Link Change Processing

The wireless system 1 according to the embodiment can change an anchor link based on a predetermined condition during a multi-link. In the following, the processing of the wireless system 1 to change an anchor link is referred to as "anchor link change processing".

Execution Conditions for Anchor Link Change Processing

Figure 14:
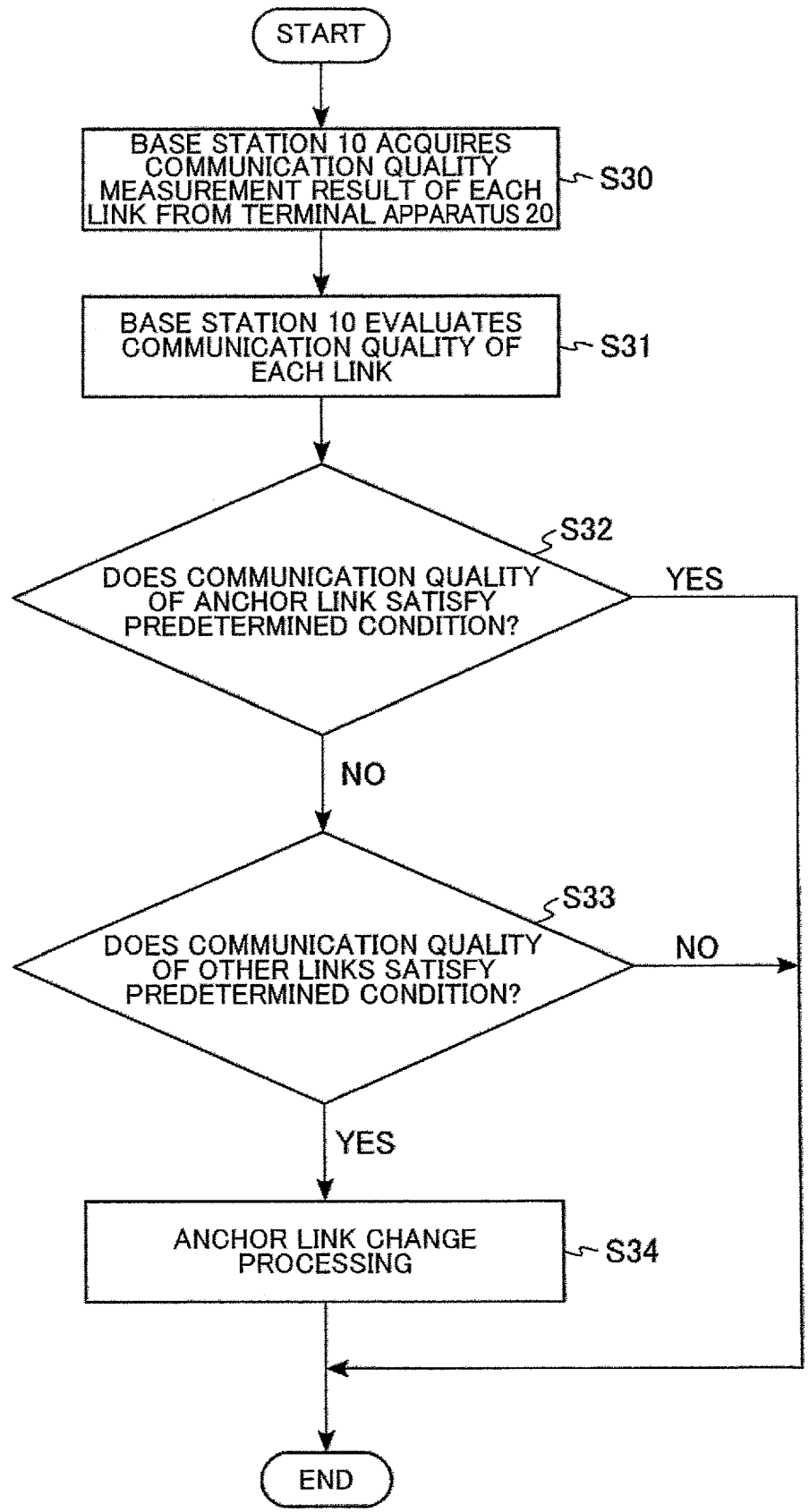
FIG. 14 is a flowchart showing an example of execution conditions for anchor link change processing in the wireless system according to the embodiment.

First, an example of execution conditions for the anchor link change processing will be described. FIG. 14 is a flowchart showing an example of execution conditions for the anchor link change processing in the wireless system 1 according to the embodiment. The link management unit LM1 of the base station 10 periodically executes the processing shown in FIG. 14 during a multi-link.

Specifically, the quality measurement unit 124 of the base station 10 acquires a communication quality measurement result of each link establishing a multi-link from the quality measurement unit 224 of the terminal apparatus 20 (step S30). Then, the quality measurement unit 124 of the base station 10 evaluates the communication quality of each link based on the received communication quality measurement result (step S31). Then, the link management unit LM1 of the base station 10 checks whether the communication quality of the anchor link satisfies a predetermined condition (step S32).

If the communication quality of the anchor link satisfies the predetermined condition (Yes in step S32), the link management unit LM1 of the base station 10 terminates the processing without changing the anchor link. On the other hand, if the communication quality of the anchor link does not satisfy the predetermined condition (No in step S32), the link management unit LM1 of the base station 10 checks whether the communication quality of the other links satisfies the predetermined condition (S33).

If the communication quality of the other links does not satisfy the predetermined condition (No in step S33), the link management unit LM1 of the base station 10 terminates the processing without changing the anchor link. On the other hand, if the communication quality of the other links satisfies the predetermined condition (Yes in step S33), the link management unit LM1 of the base station 10 executes an anchor link change processing (step S34). The link management unit LM1 of the base station 10 changes the anchor link to any of the other links through the anchor link change processing, and completes the processing.

Various parameters may be used as criteria for evaluating the communication quality of each link. In addition, various methods may be used as methods of measuring the communication quality. For example, a channel use rate, a beacon signal reception success rate, and an interference state of an Overlapping BSS (OBSS) are used as the predetermined conditions of steps S32 and S33. The predetermined condition in step S32 and the predetermined condition in step S33 may be the same or different.

When a channel use rate is used as a predetermined condition, the STA function of the terminal apparatus 20 measures the busy time rate of each channel through carrier sensing (Clear Channel Assessment (CCA) of the IEEE802.11 standard). The busy time rate corresponds to a rate of time when the received power exceeds a certain threshold. The measurement result of the busy time rate of each channel is transmitted to the quality measurement unit 224. Then, the quality measurement unit 124 of the base station 10 requests the terminal apparatus 20 for measurement and notification of the communication quality, and acquires the busy time rate measured by the quality measurement unit 224 of the terminal apparatus 20. Then, the link management unit LM1 of the base station 10 executes the anchor link change processing if the busy time rate of the channel of the anchor link exceeds a predetermined threshold. In the anchor link change processing, for example, a channel having the lowest busy time rate among a plurality of channels establishing a multi-link is determined as an anchor link.

When the beacon signal reception success rate is used as a predetermined condition, the base station 10 requests the terminal apparatus 20 for measurement and notification of a communication quality, and transmits the beacon signal by using a plurality of channels establishing the multi-link in a predetermined period. Then, the quality measurement unit 224 of the terminal apparatus 20 measures the number of beacon signals successfully received in the predetermined period for each channel, and reports the measurement result to the base station 10. Then, the link management unit LM1 of the base station 10 executes the anchor link change processing when the ratio between the number of transmitted beacon signals and the number of beacon signals successful in reception by the terminal apparatus 20 is below a certain threshold. In the anchor link change processing, for example, the channel which has received the largest number of beacon signals among the plurality of channels establishing the multi-link is determined as an anchor link. When the beacon signals are transmitted only by the anchor link, a signal for measuring a communication quality may be transmitted to another channel, or an existing signal whose transmission period and the number of transmission operations are known in advance may be used.

When the interference state of the OBSS is used as a predetermined condition, the quality measurement unit 124 of the base station 10 checks whether the interference of the OBSS in the anchor link is greater than the interference of the OBSS in the other links. In other words, the quality measurement unit 124 checks whether a channel occupancy time of the OBSS for the anchor link is longer than a channel occupancy time of the OBSS for the other links. For the evaluation of the interference, a time other than a channel occupancy time may be used, and at least a factor setting the channel to a busy state in a period other than the exchange of the signal of the BSS of the base station may be used. For example, the magnitude of interference power, interference from another communication system, the presence of noise power, and the like may be used for the evaluation of interference.

Although one parameter is used as a predetermined condition in the above description, a plurality of parameters may be used as predetermined conditions. For example, the link management unit LM1 of the base station 10 may evaluate the communication quality of each link by using both the channel use rate and the beacon signal reception success rate. For example, the link management unit LM1 of the base station 10 may execute the anchor link change processing to change the anchor link to any of the other links when the beacon signal reception success rate is below a predetermined threshold and a maximum value of the channel occupancy time rate of an OBSS of the other links is below the predetermined threshold.

Specific Example of Anchor Link Change Processing

Figure 15:
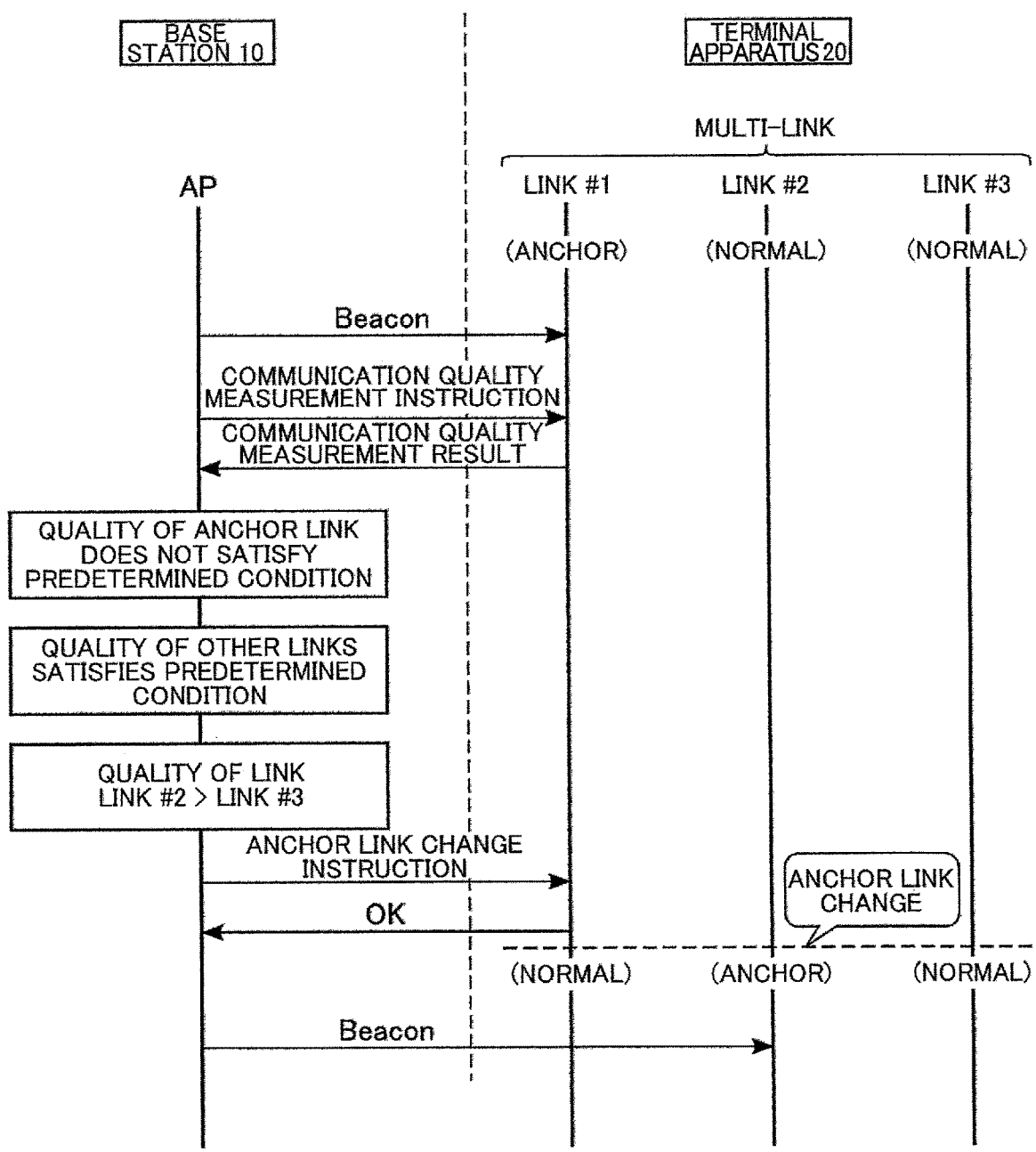
FIG. 15 is a flowchart showing a specific example of anchor link change processing in the wireless system according to the embodiment.

Next, a specific example of the anchor link change processing will be described with reference to FIG. 15. FIG. 15 is a flowchart showing a specific example of the anchor link change processing in the wireless system 1 according to the embodiment. In the initial state of a multi-link of the present example, the state shown in FIG. 9 is set. "Anchor" indicates that the multi-link is set to an anchor link. "Normal" indicates that the multi-link is not set to an anchor link. In the following, a link that is not set to an anchor link will be referred to as a "normal link".

As shown in FIG. 15, when link #1 is an anchor link, the access point AP transmits a beacon signal by using link #1, and the terminal apparatus 20 receives the beacon signal by using the STA function allocated to link #1. The link management unit LM1 of the base station 10 transmits a communication quality measurement instruction to the terminal apparatus 20 in order to periodically check the communication quality of the multi-link. The communication quality measurement instruction is transmitted by using, for example, the anchor link (link #1). Then, the quality measurement unit 224 of the terminal apparatus 20 measures the communication quality of each link constituting the multi-link based on the received communication quality measurement instruction, and transmits the communication quality measurement result to the access point AP.

When the access point AP receives the communication quality measurement result, the link management unit LM1 of the base station 10 checks that (1) the quality of the anchor link does not satisfy a predetermined condition, (2) the quality of the other links satisfies a predetermined condition, and (3) the quality of the links satisfies the relationship of link #2>link #3 in this example. Then, the link management unit LM1 of the base station 10 transmits an anchor link change instruction to the terminal apparatus 20 using the anchor link (link #1).

When the terminal apparatus 20 receives an anchor link change instruction, the link management unit LM2 of the terminal apparatus 20 transmits a positive response ("OK") to the terminal apparatus 20 via the anchor link when the change of the anchor link can be permitted. On the other hand, when the change of the anchor link cannot be permitted, the link management unit LM2 of the terminal apparatus 20 transmits a negative response ("NG") to the base station 10 via the anchor link. When transmitting a positive response to the access point AP, the link management unit LM2 of the terminal apparatus 20 changes the anchor link of the multi-link to link #2, and changes link #1 to the normal link. The access point AP transmits a beacon signal by using the changed anchor link (link #2) when receiving a positive response to the anchor link change instruction from the terminal apparatus 20.

The anchor link change processing described above is merely an example. The link management unit LM1 of the base station 10 may execute the anchor link change processing based on the communication quality of each link constituting the multi-link, and set a link having a communication quality higher than that of the current anchor link as a next anchor link. In addition, the link management unit LM1 of the base station 10 may change the anchor link to another link based on the fact that the communication quality of the anchor link is below the communication quality of the other link, regardless of the state of the communication quality of the anchor link. The "Positive response" and "negative response" may be transmitted using a link other than the anchor link.

Wireless Frame Used in Anchor Link Change Processing

Figure 16:
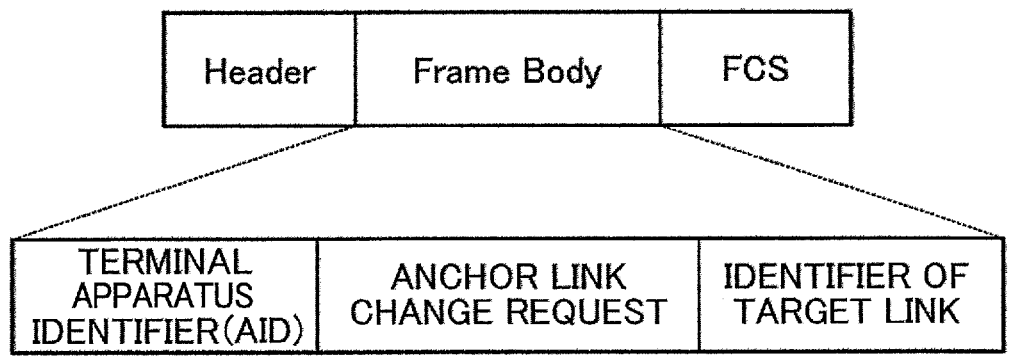
FIG. 16 is a conceptual diagram illustrating a specific example of a wireless frame used in the anchor link change processing of the wireless system according to the embodiment.
Figure 17:
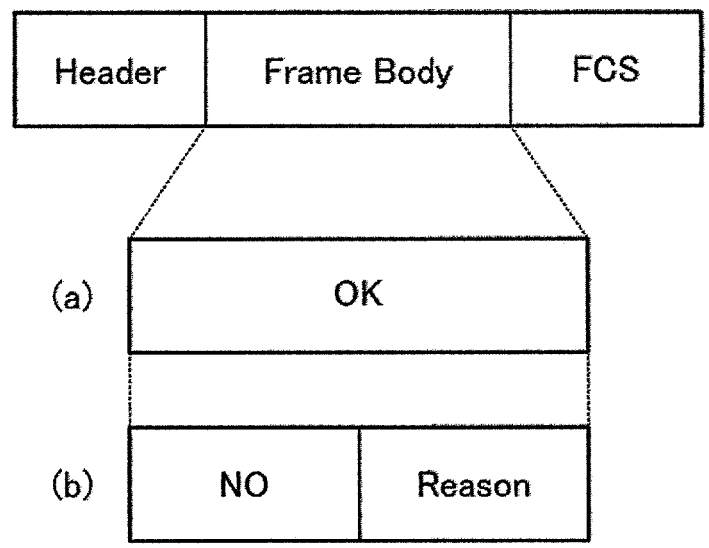
FIG. 17 is a conceptual diagram illustrating a specific example of the wireless frame used in the anchor link change processing of the wireless system according to the embodiment.

FIGS. 16 and 17 illustrate specific examples of the wireless frames used in the anchor link change processing of the wireless system 1 according to the embodiment. FIG. 16 corresponds to a wireless frame to be transmitted when the access point AP requests the terminal apparatus 20 to change the anchor link. FIG. 17 corresponds to a wireless frame that the terminal apparatus 20 returns to the access point AP in response to the request for the anchor link change.

As illustrated in FIG. 16, the Frame Body of the wireless frame requesting change of the anchor link includes, for example, a terminal apparatus identifier Association Identifier (AID), an anchor link change request, and an identifier of the target link that is a change destination of the anchor link. The link management unit LM2 of the terminal apparatus 20 corresponding to the AID refers to the "identifier of the target link" based on the "anchor link change request" and determines whether the anchor link can be changed.

When the anchor link can be changed, the Frame Body of the wireless frame corresponding to a positive response to the anchor link change request includes "OK" as illustrated in FIG. 17($a$). "OK" corresponds to a bit for notifying that the anchor link can be changed. On the other hand, when the anchor link cannot be changed, the Frame Body of the wireless frame corresponding to a negative response to the anchor link change request includes "NO" and "Reason" as illustrated in FIG. 17($b$). "NO" corresponds to a bit for notifying that the anchor link cannot be changed. "Reason" corresponds to a bit for notifying the reason that the anchor link cannot be changed. "Reason" in the wireless frame corresponding to the response to the anchor link change request may be omitted.

<2-4> Acquisition Method of Communication Quality

Next, a method of acquiring a communication quality measurement result in the wireless system 1 according to a first embodiment will be described. Operations of the base station 10 to acquire a communication quality measurement result of each link constituting a multi-link include two types of operation, that is, an operation executed on initiative of the base station 10 and an operation executed on initiative of the terminal apparatus 20. These two types of operation may be executed periodically or in an event-driven manner. A method of acquiring a communication quality measurement result will be described below with reference to an example in which a multi-link is set to the state shown in FIG. 9.

Operation Executed on Initiative of Base Station 10

Figure 18:
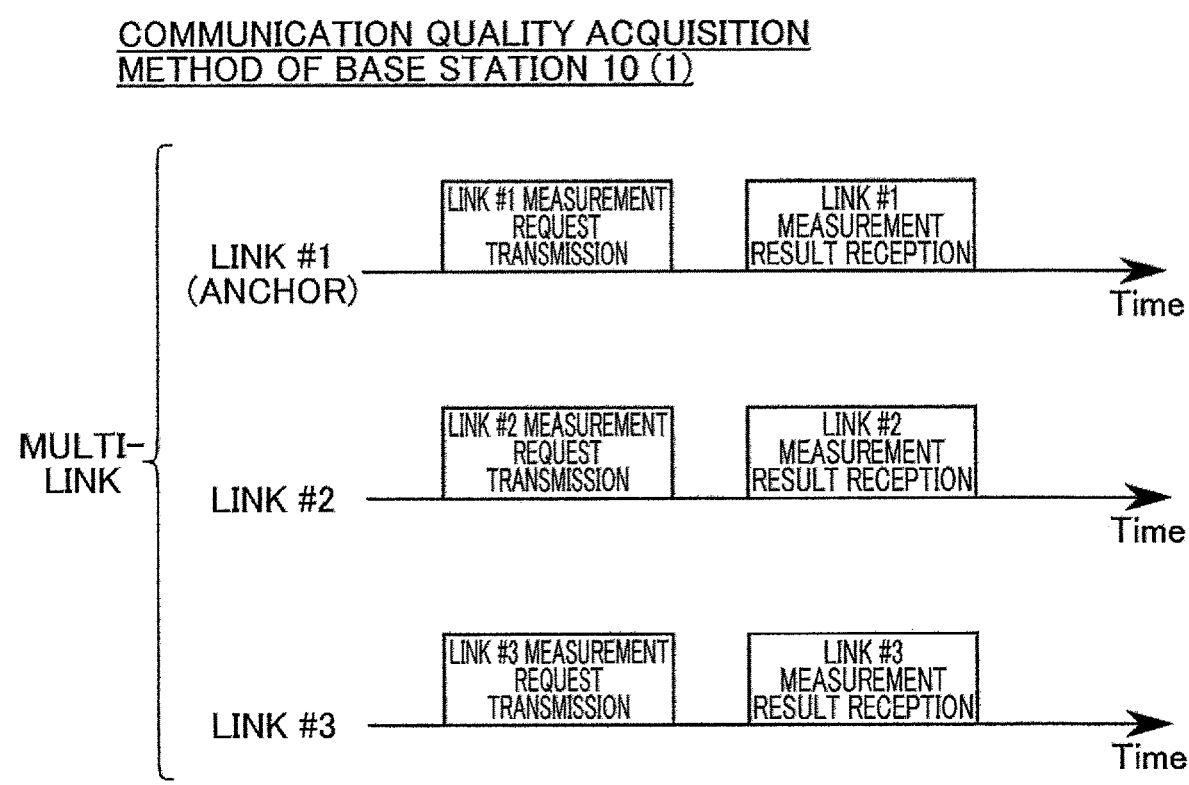
FIG. 18 is a conceptual diagram illustrating an example of a method of the base station to acquire a communication quality measurement result in the wireless system according to the embodiment.
Figure 19:
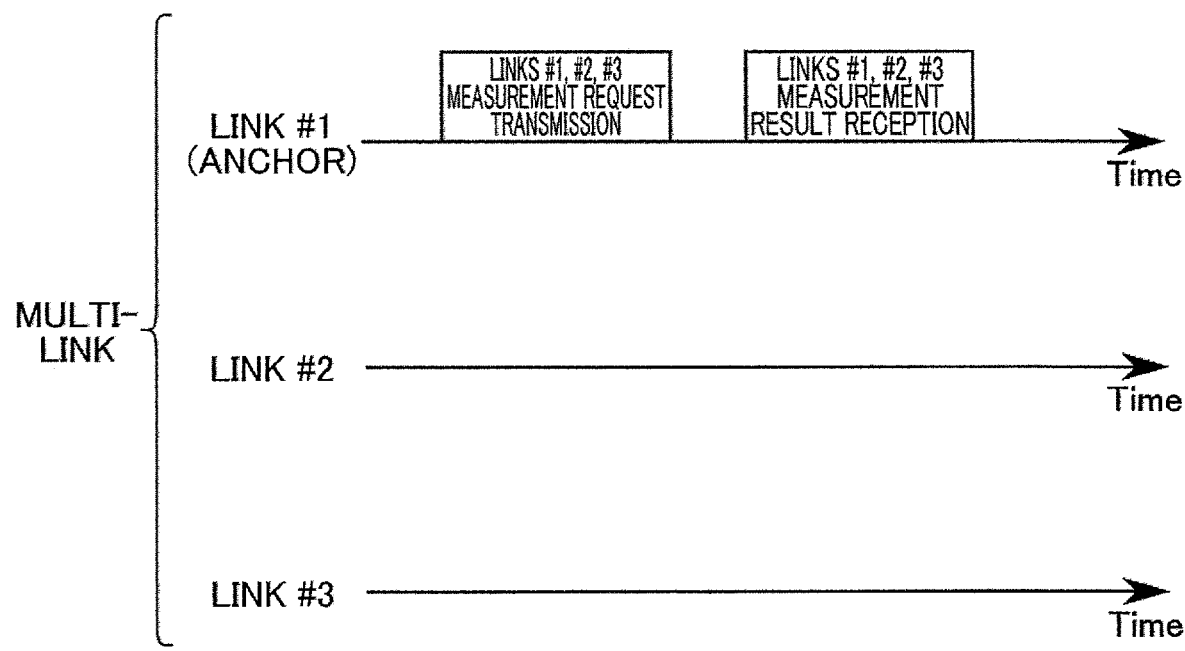
FIG. 19 is a conceptual diagram illustrating the example of the method of the base station to acquire a communication quality measurement result in the wireless system according to the embodiment.

FIGS. 18 and 19 illustrate an example of a method of acquiring a communication quality measurement result by the base station 10 included in the wireless system 1 according to the embodiment, and correspond to a case where the acquisition of the communication quality measurement result is periodically executed on the initiative of the base station 10.

As illustrated in FIG. 18, the base station 10 uses link #1 (anchor link), link #2, and link #3 to transmit a measurement request of link #1, a measurement request of link #2, and a measurement request of link #3 to the terminal apparatus 20, respectively. Then, the terminal apparatus 20 measures a communication quality of each link by using each STA function and the quality measurement unit 224 based on reception of each measurement request, and transmits the measurement result to the base station 10.

Thus, in this example, the base station 10 acquires the communication quality measurement result by transmitting a measurement request of a communication quality to the terminal apparatus 20 using each link constituting a multi-link. Thus, the base station 10 can receive the measurement result of link #1, the measurement result of link #2, and the measurement result of link #3 from the terminal apparatus 20 via link #1, link #2, and link #3, respectively.

The base station 10 may collectively transmit measurement requests of the communication quality of each link together to the terminal apparatus 20 by using only the anchor link, and may receive the communication quality measurement results of each link from the terminal apparatus 20 collectively as illustrated in FIG. 19. In this case, the base station 10 uses the anchor link (link #1) to transmit the measurement requests of each of link #1, link #2, and link #3. Then, the terminal apparatus 20 uses the anchor link to transmit the communication quality measurement results of each of link #1, link #2, and link #3 to the base station 10.

Figure 20:
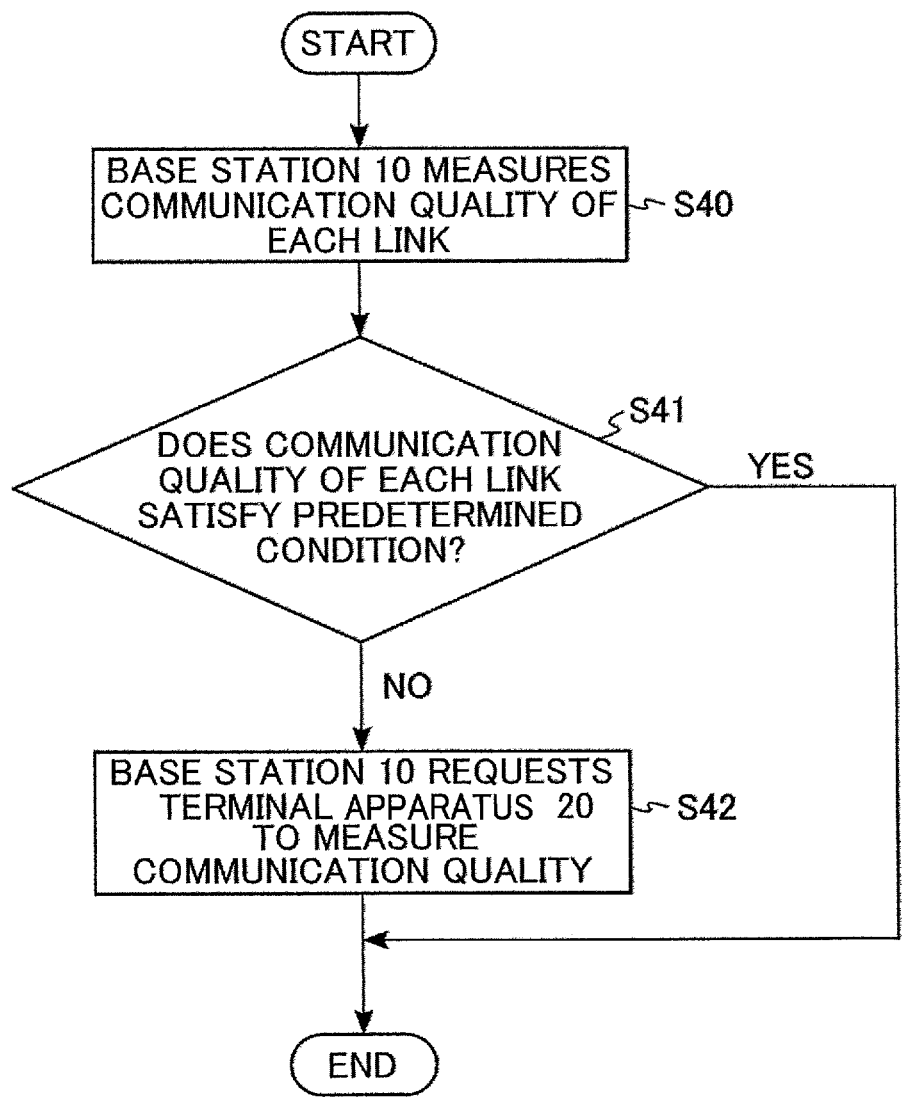
FIG. 20 is a flowchart showing the example of the method of the base station to acquire a communication quality measurement result in the wireless system according to the embodiment.

FIG. 20 shows an example of the method of the base station 10 to acquire a communication quality in the wireless system 1 according to the embodiment, and corresponds to a case where the acquisition of a communication quality is executed on initiative of the base station 10 in an even-driven manner. The link management unit LM1 of the base station 10 sequentially executes the operation shown in FIG. 20 during a multi-link.

Specifically, the quality measurement unit 124 of the base station 10 measures a communication quality of each link constituting the multi-link (step S40). Then, the link management unit LM1 of the base station 10 checks whether the communication quality of each link satisfies a predetermined condition (step S41). When the communication quality of each link satisfies the predetermined condition (Yes in step S41), the link management unit LM1 of the base station 10 terminates the operation. On the other hand, when the communication quality of each link does not satisfy the predetermined condition (No in step S41), the base station 10 requests the terminal apparatus 20 to measure the communication quality (step S42).

As described above, the base station 10 may transmit a measurement request to the terminal apparatus 20 when a parameter to measure the quality of each channel used by the base station and evaluate the communication quality satisfies a predetermined condition. As parameters to evaluate the communication quality, various parameters can be used, and for example, a channel use rate is used. In this case, the link management unit LM1 of the base station 10 transmits a measurement request to the terminal apparatus 20, for example, based on the fact that a channel use rate of the anchor link is below a predetermined threshold.

Operation Executed on Initiative of Terminal Apparatus 20

Figure 21:
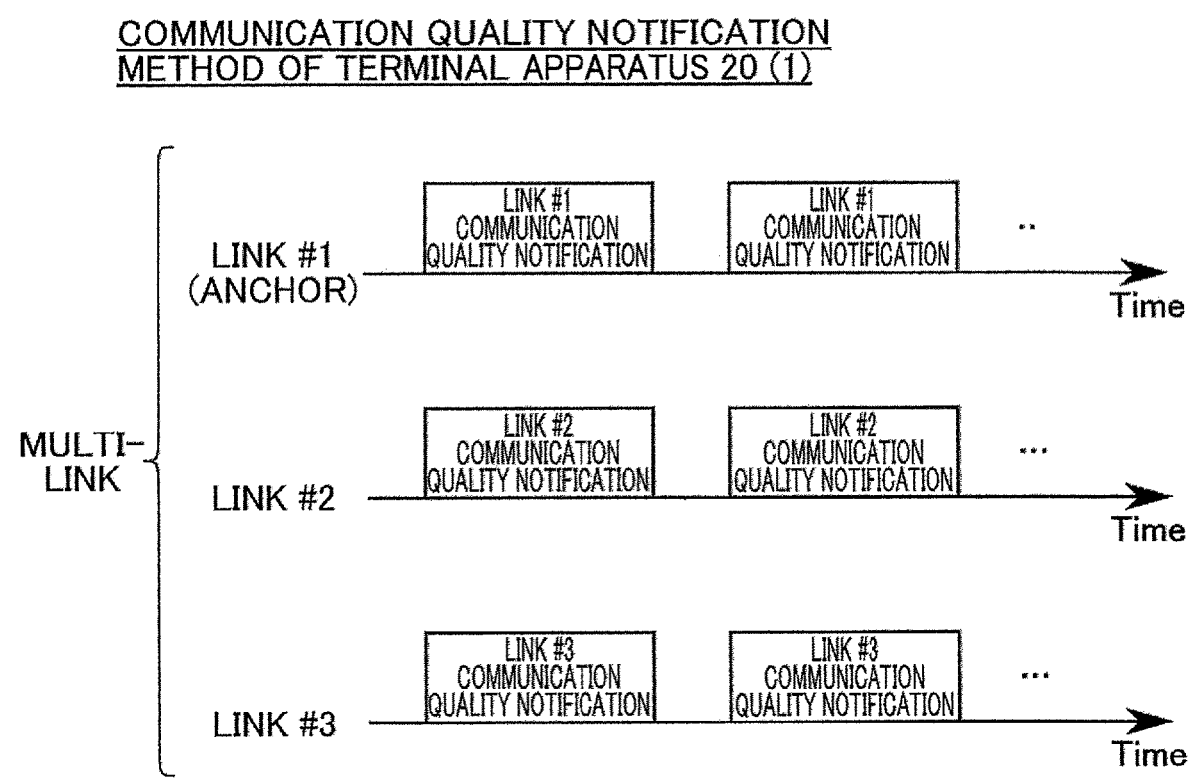
FIG. 21 is a conceptual diagram illustrating an example of a method of the terminal apparatus to give a notification of a communication quality measurement result in the wireless system according to the embodiment.
Figure 22:
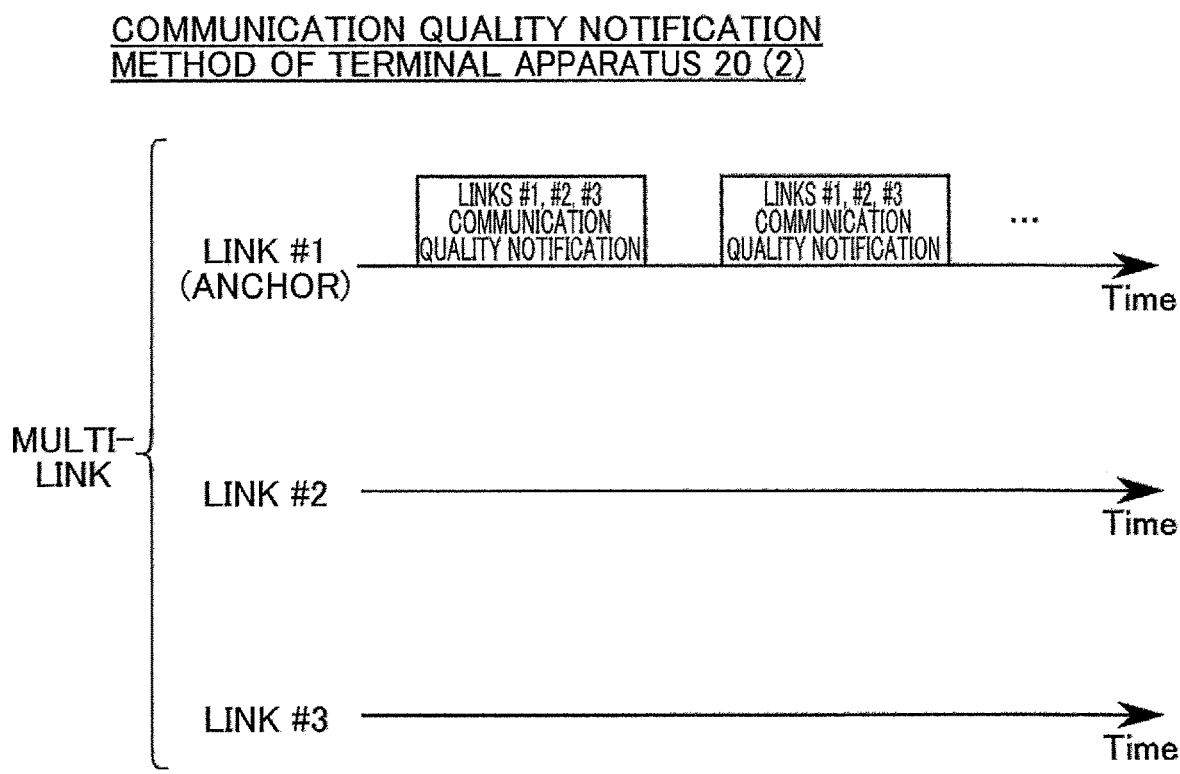
FIG. 22 is a conceptual diagram illustrating the example of the method of the terminal apparatus to give a notification of a communication quality measurement result in the wireless system according to the embodiment.

FIGS. 21 and 22 illustrate an example of a communication quality notification method by the terminal apparatus 20 included in the wireless system 1 according to the embodiment, and correspond to a case where a communication quality notification is periodically executed on the initiative of the terminal apparatus 20.

The terminal apparatus 20 uses link #1 (anchor link), link #2, and link #3 to notify the base station 10 of the measurement results of the communication quality of link #1, the communication quality of link #2, and the communication quality of link #3, respectively, as illustrated in FIG. 21. Then, the base station 10 determines whether to execute the anchor link change processing based on the received communication quality measurement results.

As described above, in this example, the terminal apparatus 20 periodically measures the communication quality of each channel and spontaneously transmits the measurement results to the base station 10 by using each link constituting the multi-link. Thus, the base station 10 can receive the measurement result of link #1, the measurement result of link #2, and the measurement result of link #3 from the terminal apparatus 20 via link #1, link #2, and link #3, respectively.

As illustrated in FIG. 22, the terminal apparatus 20 may collectively transmit the measurement results of the communication quality of each link to the base station 10 by using only the anchor link. In this case, the terminal apparatus 20 uses the anchor link (link #1) to transmit the communication quality measurement results of each of link #1, link #2, and link #3 to the base station 10.

Figure 23:
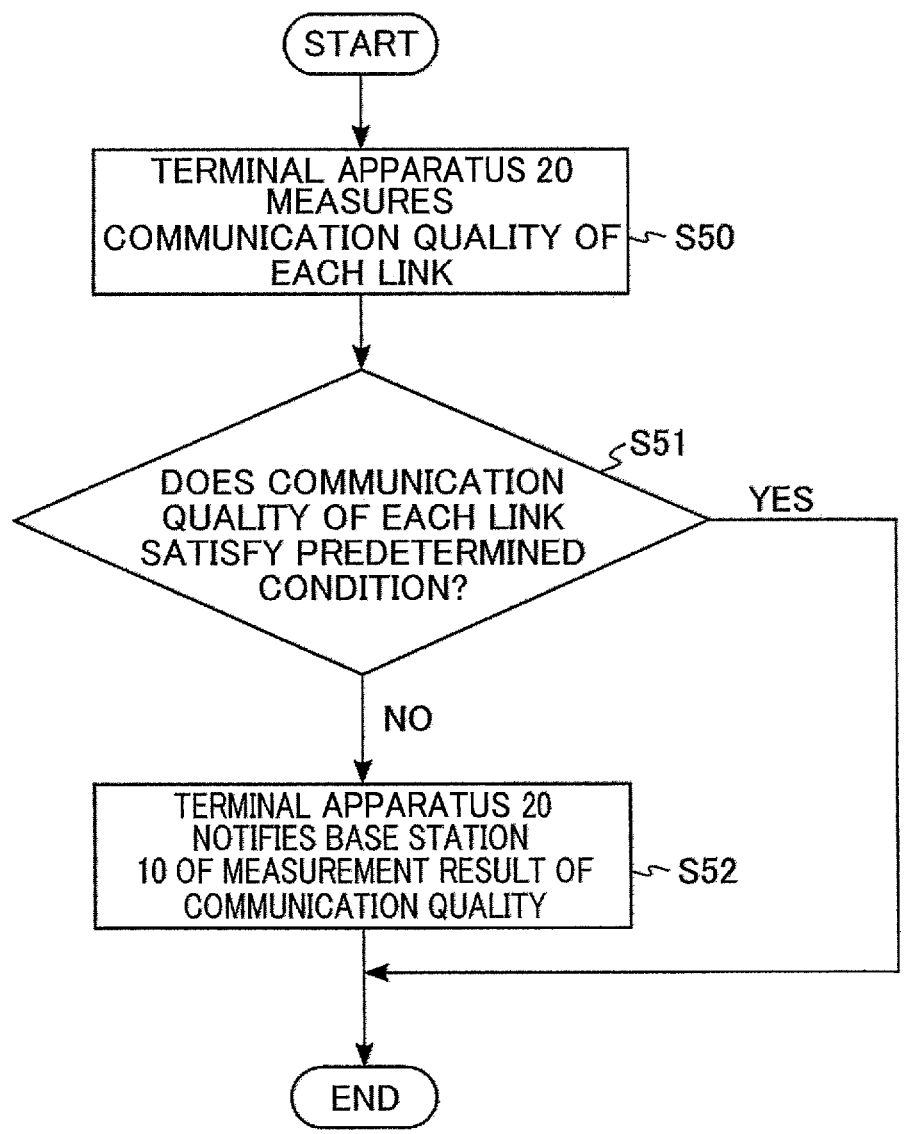
FIG. 23 is a flowchart showing the example of the method of the terminal apparatus to give a notification of a communication quality measurement result in the wireless system according to the embodiment.

FIG. 23 shows an example of a communication quality notification method of the terminal apparatus 20 included in the wireless system 1 according to the embodiment, and corresponds to a case where notification of a communication quality is executed on initiative of the terminal apparatus 20 in an event-driven manner. The link management unit LM2 of the terminal apparatus 20 sequentially executes the operation shown in FIG. 23 during a multi-link.

Specifically, the quality measurement unit 224 of the terminal apparatus 20 measures a communication quality of each link constituting the multi-link (step S50). Then, the link management unit LM2 of the terminal apparatus 20 checks whether the communication quality of each link satisfies a predetermined condition (step S51). When the communication quality of each link satisfies the predetermined condition (Yes in step S51), the link management unit LM1 of the terminal apparatus 20 terminates the operation. On the other hand, when the communication quality of each link does not satisfy the predetermined condition (No in step S51), the terminal apparatus 20 notifies the base station 10 of the communication quality measurement results (step S52).

In this way, the terminal apparatus 20 may measure the communication quality of each channel constituting the multi-link, and notify the base station 10 of the communication quality measurement results when the parameter to evaluate the communication quality satisfies a predetermined threshold. As parameters to evaluate the communication quality, various parameters can be used, and for example, a channel use rate is used. In this case, the link management unit LM2 of the terminal apparatus 20 notifies the base station 10 of the communication quality measurement results, for example, based on the fact that a channel use rate of the anchor link is below a predetermined threshold.

<3> Advantageous Effects of Embodiment

According to the wireless system 1 according to the embodiment described above, communication stability during a multi-link can be improved. Hereinafter, the details of the advantageous effects of the wireless system 1 according to the embodiment will be described.

Base stations and terminal apparatuses that use a wireless LAN may include a plurality of STA functions provided for each band to be used, for example, the bands of 2.4 GHz, 5 GHz, and 6 GHz. In such a wireless system, for example, wireless connection is established and data communication between the base stations and the terminal apparatuses is performed by selecting one STA function among the plurality of STA functions. At this time, in the wireless system, unselected STA functions are not used even when there is a base station corresponding to the bands of the STA functions.

In the wireless system 1 according to the embodiment, however, a plurality of STA functions provided in each of the base station 10 and the terminal apparatus 20 are utilized to establish a multi-link between the base station 10 and the terminal apparatus 20. In data communication using the multi-link, the plurality of bands can be used together, and the functions of a wireless LAN device can be sufficiently utilized. As a result, the wireless system 1 according to the embodiment can realize efficient communication and can improve a communication speed.

Furthermore, as a method of operating the multi-link, it is conceivable to set an anchor link using information of control of the multi-link for transmission and reception. By setting the anchor link, the wireless system 1 can simplify communication between the link management unit LM1 of the base station 10 and the link management unit LM2 of the terminal apparatus 20.

On the other hand, in the multi-link, there is a case in which communication stability differs in each link constituting the multi-link. For example, the interference state due to the OBSS and the intensity of radio waves may vary depending on the frequency band being used. Therefore, when an anchor link is set in the multi-link, the communication quality of the anchor link may be lower than the communication quality of another link. Since the anchor link is used for controlling the entire multi-link, it is preferable to have higher a communication quality than other links.

Therefore, the wireless system 1 according to the embodiment changes settings of the anchor link in accordance with the communication quality of each link used in the multi-link. Specifically, the quality measurement unit 224 of the terminal apparatus 20 measures a communication quality of each link constituting the multi-link, and notifies the base station 10 of the measurement result. Then, the quality measurement unit 124 of the base station 10 periodically evaluates a communication quality of each link constituting the multi-link based on the received communication quality measurement result.

Then, when the quality measurement unit 124 detects "the channel use rate of the anchor link is higher than the channel use rate of the other links", the link management unit LM1 sets a link having a channel use rate lower than that of the anchor link among the other links as an anchor link. When the setting of the anchor link is changed in this way, the channel use rate of the anchor link is lowered, and the communication quality of the anchor link is improved.

As described above, in the wireless system 1 according to the embodiment, the anchor link is appropriately changed based on a predetermined condition so that the communication quality of the anchor link is maintained in a high state. As a result, the wireless system 1 according to the embodiment can suppress deterioration in a communication quality of the entire multi-link due to transmission of control information through a link having a low communication quality, and can improve communication stability during a multi-link. The role of the anchor link is not limited to transmission and reception of information related to the control of the multi-link described above. The anchor link may have a different role from the other links in the multi-link. For example, the anchor link may be used to give notification of traffic information in each link (information of data accumulated in an access point). The anchor link may be used for traffic transmission requiring a low latency. When the anchor link communicates with a specific communication device, weighting of the amount of traffic between the anchor link and the other links may be changed.

<4> Modified Example of Embodiment

Although the case where the base station 10 establishes a multi-link with one terminal apparatus 20 has been exemplified in the embodiment, the base station 10 may establish a multi-link with a plurality of terminal apparatuses 20. Hereinafter, as a modified example of the embodiment, a variation of the operation when the base station 10 and a plurality of terminal apparatuses 20 establishes a multi-link will be described.

Figure 24:
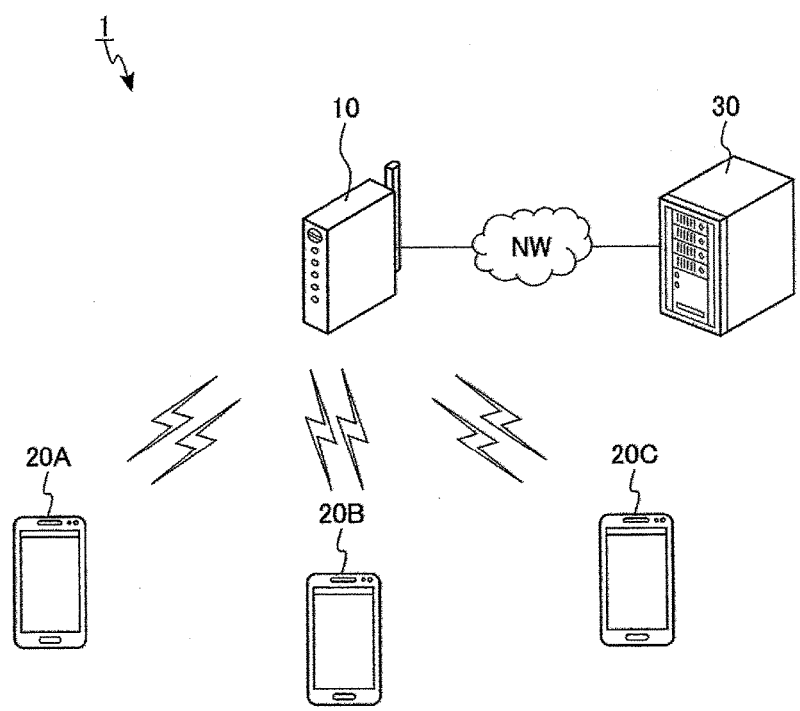
FIG. 24 is a conceptual diagram illustrating an example of an overall configuration of a wireless system according to a modified example of the embodiment.

FIG. 24 illustrates an example of an overall configuration of a wireless system 1 according to a modified example of the embodiment. As illustrated in FIG. 24, in the modified example of the embodiment, three terminal apparatuses 20A, 20B and 20C are connected to the base station 10. Then, multi-links are established between the base station 10 and the terminal apparatuses 20A, 20B, and 20C, respectively. The number of terminal apparatuses 20 connectable to the base station 10 can be set in accordance with the performance of the base station 10. When a plurality of terminal apparatuses 20 are connected to the base station 10, the base station 10 may use a multi-link and a single link in combination.

FIG. 25 illustrates combinations of link sets for a multi-link and settings of an anchor link used in the wireless system 1 according to the modified example of the embodiment. A "link set" corresponds to a set of a plurality of links constituting a multi-link. When a multi-link is established between the base station 10 and the plurality of terminal apparatuses 20, four combinations shown in FIG. 25 are considered as combinations of link sets for a multi-link and setting for an anchor link.

A first combination corresponds to a case where the link sets for the multi-link and the settings of the anchor link are common to all of the terminal apparatuses 20. A second combination corresponds to a case where the link sets for the multi-link is allowed to differ among the plurality of terminal apparatuses 20 and the settings of the anchor link is common to all the terminal apparatuses 20. A third combination corresponds to a case where the link sets for the multi-link is common to all of the terminal apparatuses 20 and the settings of the anchor link is allowed to differ among the plurality of terminal apparatuses 20. A fourth combination corresponds to a case where it is allowed that the link sets for the multi-link differ among the plurality of terminal apparatuses 20 in each terminal apparatus 20 and that the settings of the anchor link differ among the plurality of terminal apparatuses 20.

Hereinafter, the first to fourth combinations are referred to as first to fourth modified examples of the embodiment, respectively. In addition, in order to simplify the explanation, a case where two terminal apparatuses 20A and 20B are connected to the base station 10 will be described as an example.

<4-1> First Modified Example

FIG. 26 shows an example of the link management information 121 in the wireless system 1 according to a first modified example of the embodiment. As shown in FIG. 26, the link sets for each of the terminal apparatuses 20A and 20B in the first modified example are similar to the link sets shown in FIG. 9. That is, a combination of frequency bands and channels of a plurality of links constituting a multi-link is common between the link sets for the terminal apparatus 20A and the link sets for the terminal apparatus 20B, and a frequency band and a channel used as an anchor link are common. Hereinafter, links of the terminal apparatus 20A to STA1, STA2 and STA3 are also referred to as link #1, link #2, and link #3, respectively. Links of the terminal apparatus 20B to STA1, STA2 and STA3 are also referred to as link #4, link #5, and link #6, respectively. Although a case where the same TID is used for each terminal apparatus 20 has been exemplified in the present specification, different TIDs may be used for each of terminal apparatuses 20. That is, arbitrary association of traffic with TIDs can be set for each terminal apparatus 20.

Figure 27:
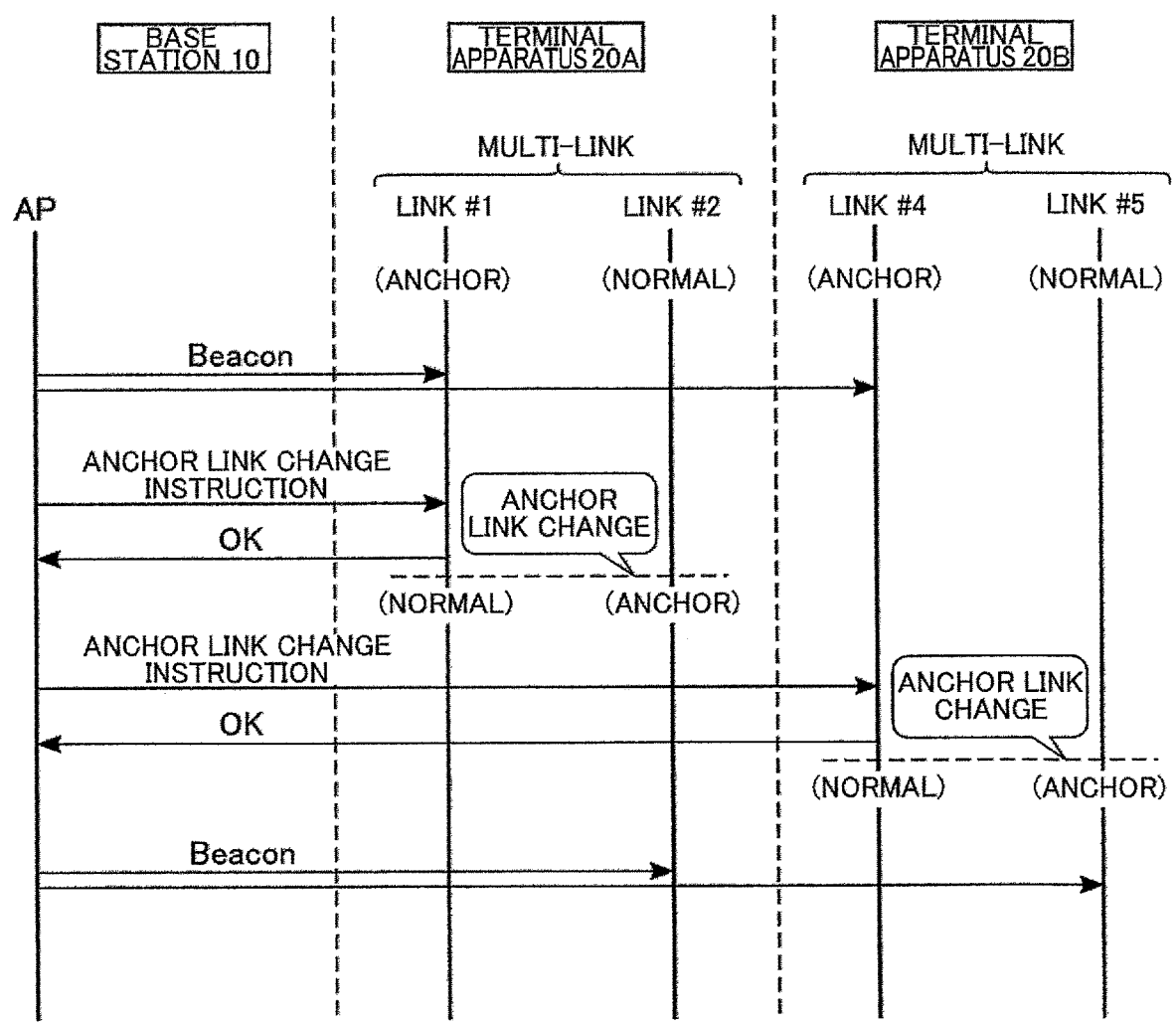
FIG. 27 is a flowchart showing a specific example of anchor link change processing in the wireless system according to the first modified example of the embodiment.

FIG. 27 illustrates a specific example of anchor link change processing in a wireless system according to a first modified of the embodiment. In FIG. 27, illustration of link #3 of the terminal apparatus 20A and link #6 of the terminal apparatus 20B is omitted. As illustrated in FIG. 27, in the first modified example, the base station 10 transmits a beacon signal including control information of a Basic Service Set (BSS) by using only an anchor link (e.g., link #1 of the terminal apparatus 20A and link $4 of the terminal apparatus 20B).

For example, when each of the terminal apparatuses 20A and 20B satisfies an execution condition for the anchor link change processing, the link management unit LM1 of the base station 10 sequentially executes the anchor link change processing to each of the terminal apparatuses 20A and 20B. Specifically, first, the link management unit LM1 of the base station 10 transmits an anchor link change instruction to the terminal apparatus 20A, and sets the anchor link to link #2 based on a positive response from the terminal apparatus 20A. Next, the link management unit LM1 of the base station 10 transmits an anchor link change instruction to the terminal apparatus 20B, and sets the anchor link to link #5 based on a positive response from the terminal apparatus 20B.

In the present example, link #2 of the terminal apparatus 20A and link #5 of the terminal apparatus 20B are set to the same frequency band and channel. In this way, the link management unit LM1 of the base station 10 changes the anchor link so that the frequency band and channel of the anchor link are common to each terminal apparatus 20 through the anchor link change processing with respect to each terminal apparatus 20. When the anchor link change processing for all of the terminal apparatuses 20 for which the multi-link has been established is completed, the base station 10 transmits a beacon signal by using only the updated anchor link.

As described above, the wireless system 1 according to the first modified example of the embodiment executes the anchor link change processing for the plurality of terminal apparatuses 20 based on the communication quality of the anchor link. As a result, the wireless system 1 according to the first modified example of the embodiment can also improve communication stability in the multi-link to each of the terminal apparatuses 20.

When a plurality of terminal apparatuses 20 are connected to the base station 10, the link management unit LM1 of the base station 10 may evaluate the communication quality using the average and the maximum value of the busy time rates acquired from each of the terminal apparatus 20. In this case, the link management unit LM1 of the base station 10 executes the anchor link change processing based on, for example, the fact that the average of the busy time rates acquired from each of the terminal apparatuses 20 exceeds a predetermined threshold. In addition, the anchor link change processing for a plurality of terminal apparatuses 20 with which the base station 10 establishes a multi-link may be executed in parallel.

<4-2> Second Modified Example

FIG. 28 illustrates an example of link management information 121 in the wireless system 1 according to a second modified example of the embodiment. In the second modified example, the link set for the terminal apparatus 20A and the link set for the terminal apparatus 20B have common frequency bands and channels used as anchor links, and combinations of a plurality of links constituting a multi-link vary as illustrated in FIG. 28. Specifically, in the link set for the terminal apparatus 20A, STA2 is allocated to a channel CH2 of 5 GHz, and STA3 is allocated to the channel CH2 of 2.4 GHz. Specifically, in the link set for the terminal apparatus 20B, STA2 is allocated to a channel CH3 of 5 GHz, and STA3 is allocated to the channel CH3 of 2.4 GHz. The other configurations of the link sets of the terminal apparatuses 20A and 20B are similar to those shown in FIG. 9.

Figure 29:
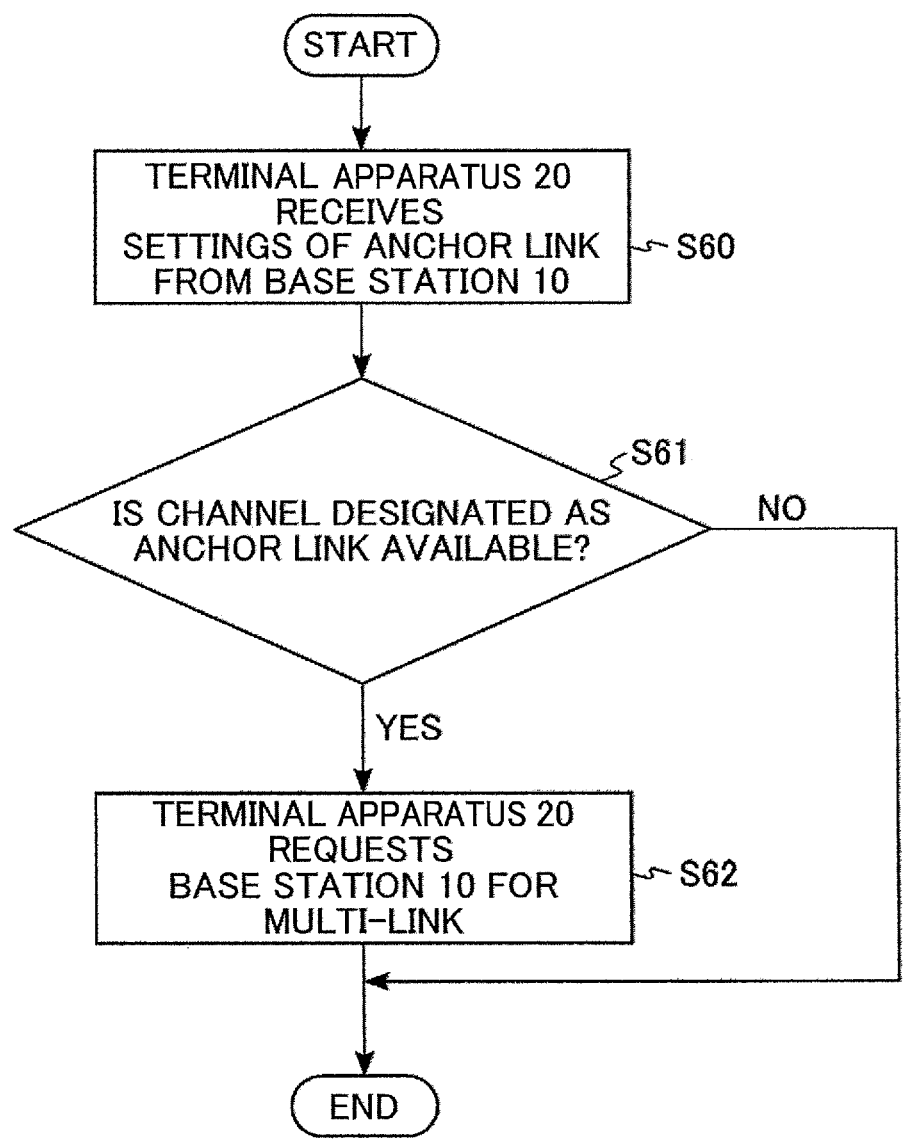
FIG. 29 is a flowchart showing a first example of multi-link processing in a wireless system according to a second modified example of the embodiment.

In the wireless system 1 according to the first modified example of the embodiment, for example, the link management unit LM1 of the base station 10 fixes a frequency band and a channel of the anchor link to be used in a multi-link. This embodiment will be described as a first example of the multi-link processing in the second modified example of the embodiment with reference to FIG. 29. FIG. 29 shows a first example of multi-link processing in the wireless system 1 according to the second modified example of the embodiment, and corresponds to an operation made before a multi-link is established between the base station 10 and the terminal apparatus 20.

As shown in FIG. 29, the terminal apparatus 20 receives a setting of an anchor link from the base station 10 (step S60). Then, the link management unit LM2 of the terminal apparatus 20 checks whether a channel designated as an anchor link is available (step S61). When a channel designated as an anchor link is not available (No in step S61), the link management unit LM2 of the terminal apparatus 20 gives up establishment of a multi-link with the base station 10. On the other hand, when the channel designated as an anchor link is available (Yes in step S61), the link management unit LM2 of the terminal apparatus 20 requests the base station 10 to establish a multi-link (step S62). The processing of step S62 corresponds to the processing of steps S12 of FIG. 10.

In this way, in the first example of the multi-link processing in the second modified example of the embodiment, it is determined whether the multi-link can be used depending on whether the terminal apparatus 20 can use the designated frequency band and channel. Thus, the first example of the multi-link processing in the second modified example of the embodiment can guarantee the lowest quality of the multi-link.

Figure 30:
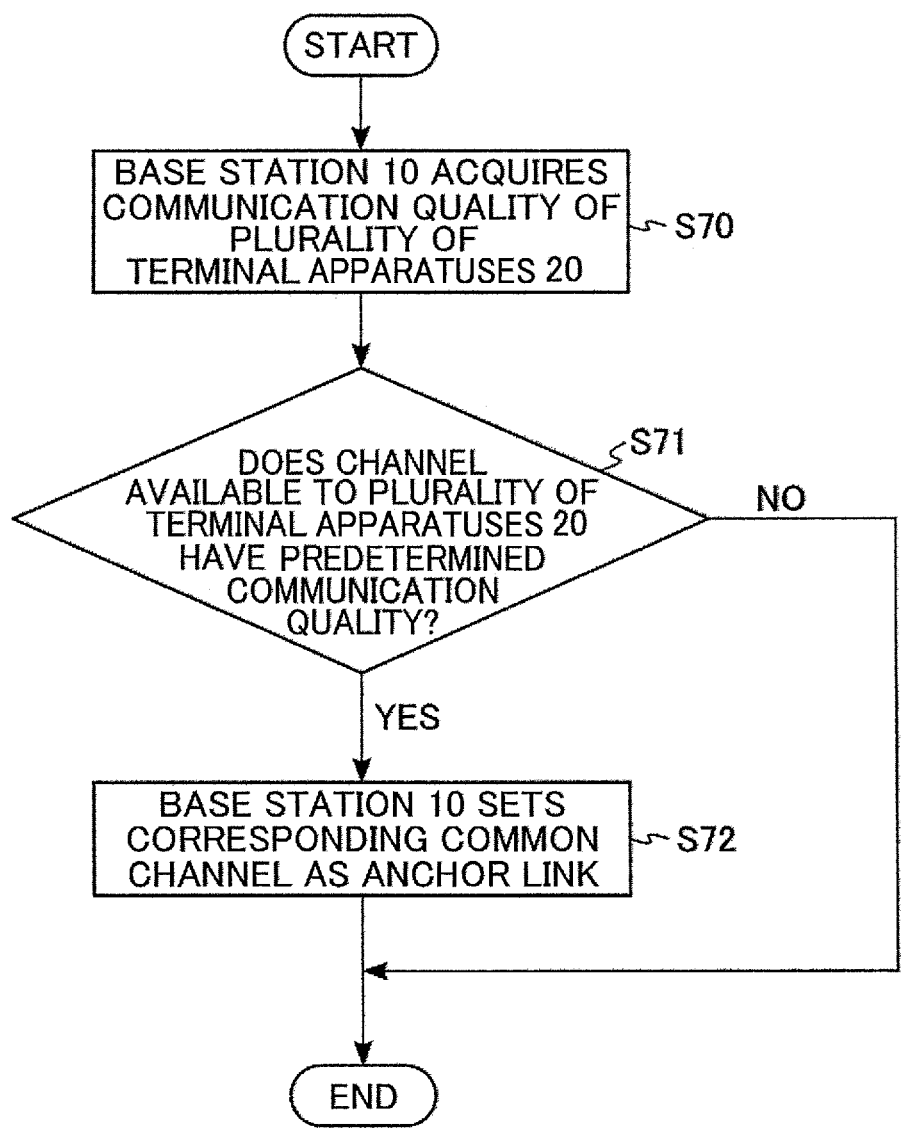
FIG. 30 is a flowchart showing a second example of multi-link processing in the wireless system according to the second modified example of the embodiment.

On the other hand, the wireless system 1 according to the second modified example of the embodiment may set a channel having the highest communication quality among the plurality of terminal apparatuses 20 as a first anchor link. This embodiment will be described as a second example of the multi-link processing in the second modified example of the embodiment with reference to FIG. 30. FIG. 30 shows a second example of the multi-link processing in the wireless system 1 according to the second modified example of the embodiment, and corresponds to an operation performed before a multi-link is established between the base station 10 and a plurality of terminal apparatuses 20.

As shown in FIG. 30, the base station 10 acquires a communication quality of the plurality of terminal apparatuses 20 (step S70). Then, the link management unit LM1 of the base station 10 checks whether a channel available to the plurality of terminal apparatuses 20 for a multi-link has a predetermined communication quality (step S71). If the channel available to the plurality of terminal apparatuses 20 for a multi-link does not have a predetermined communication quality (No in step S71), the link management unit LM1 of the base station 10 sets, for example, a preset anchor link as a first anchor link. On the other hand, if the channel available to the plurality of terminal apparatuses 20 for a multi-link has the predetermined communication quality (Yes in step S71), the link management unit LM1 of the base station 10 sets the common channel as an anchor link (step S72).

In the second example of the multi-link processing in the second modified example of the embodiment, the base station 10 sets an optimum anchor link for the plurality of terminal apparatuses 20 as described above. Thus, the second example of the multi-link processing in the second modified example of the embodiment can improve the communication quality of each multi-link of the plurality of terminal apparatuses 20 in the BSS.

In all of the first and second examples of the multi-link processing in the second modified example of the embodiment described above, settings of the other links except for the anchor link may differ for each of the terminal apparatuses 20. That is, since the degree of freedom in the frequency band and the channel used in the multi-link in the second modified example of the embodiment is higher than that of the embodiment, an optimum link set can be configured for each of the terminal apparatuses 20. As a result, the wireless system 1 according to the second modified example of the embodiment can improve the communication quality of the multi-link for each terminal apparatuses 20.

<4-3> Third Modified Example

FIG. 31 illustrates an example of link management information 121 in the wireless system 1 according to a third modified example of the embodiment. As illustrated in FIG. 31, in the third modified example, a common link set is used for the link set of the terminal apparatus 20A and the link set of the terminal apparatus 20B, and settings of the anchor links are different. Specifically, in the link set for the terminal apparatus 20A, an anchor link is allocated to a channel CH1 of 6 GHz. In the link set for the terminal apparatus 20B, an anchor link is allocated to a channel CH2 of 5 GHz. The other configurations of the link sets of the terminal apparatuses 20A and 20B are similar to those shown in FIG. 9.

Figure 32:
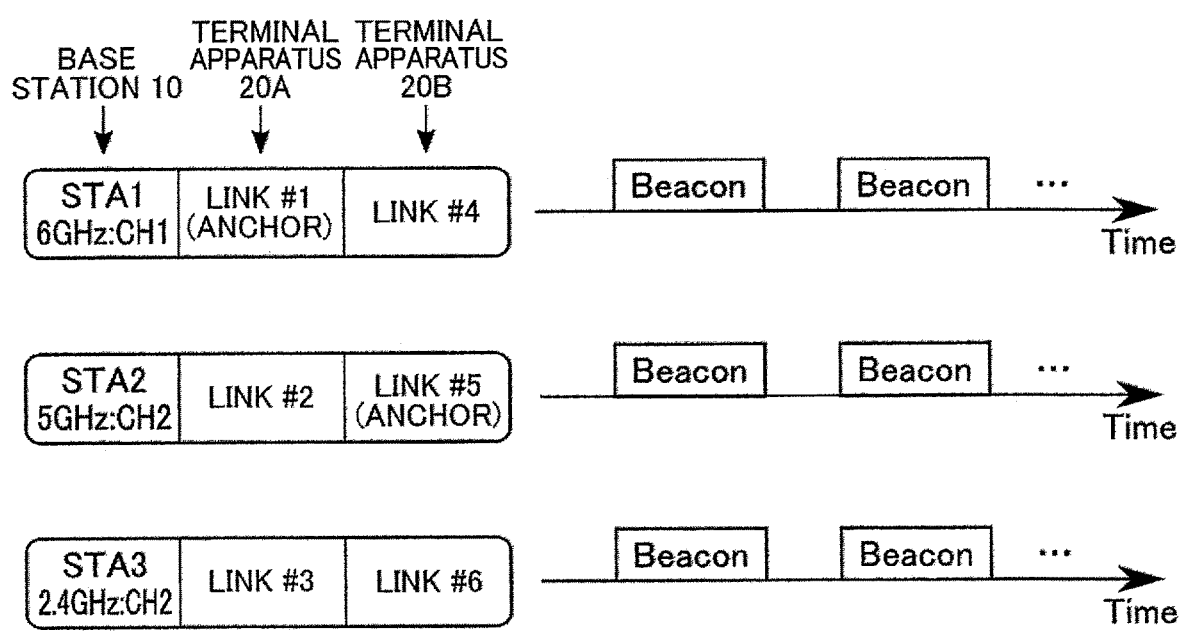
FIG. 32 is a conceptual diagram illustrating an example of a method of a base station to output a beacon signal in the wireless system according to the third modified example of the embodiment.

FIG. 32 illustrates an example of a beacon signal output method of the base station 10 included in the wireless system 1 according to the third modified example of the embodiment. As illustrated in FIG. 32, in the wireless system 1 according to the third modified example of the embodiment, the base station 10 transmits beacon signals by using all STA functions used in a multi-link. Thus, each of the terminal apparatuses 20 having a multi-link established with the base station 10 can receive the beacon signals even if the frequency band and channel of the anchor link differ for each terminal apparatus 20.

In the third modified example of the embodiment, the base station 10 may transmit the beacon signals using at least a frequency band and a channel set in the anchor link. The beacon signals may be transmitted using a link other than the anchor link or may not be transmitted. For example, in the example illustrated in FIG. 32, the transmission of the beacon signal by STA 3 of the base station 10 may be omitted. The base station 10 in the third modified example of the embodiment can reduce power consumption by omitting transmission of a beacon signal using an STA function not used as an anchor link.

<4-4> Fourth Modified Example

FIG. 33 illustrates an example of link management information 121 in the wireless system 1 according to a fourth modified example of the embodiment. As illustrated in FIG. 33, in the fourth modified example, different link sets are used for the link set for the terminal apparatus 20A and the link set for the terminal apparatus 20B, and settings of the anchor link are different. Specifically, in the link set for the terminal apparatus 20A, STA1 is allocated to a channel CH1 of 6 GHz, STA2 is allocated to a channel CH2 of 5 GHz, STA3 is allocated to a channel CH2 of 2.4 GHz, and the anchor link is set to STA1. In the link set for the terminal apparatus 20B, STA1 is allocated to the channel CH2 of 6 GHz, STA2 is allocated to a channel CH3 of 5 GHz, STA3 is allocated to a channel CH3 of 2 GHz, and the anchor link is set to STA1. The other configurations of the link sets of the terminal apparatuses 20A and 20B are similar to those shown in FIG. 9.

Figure 34:
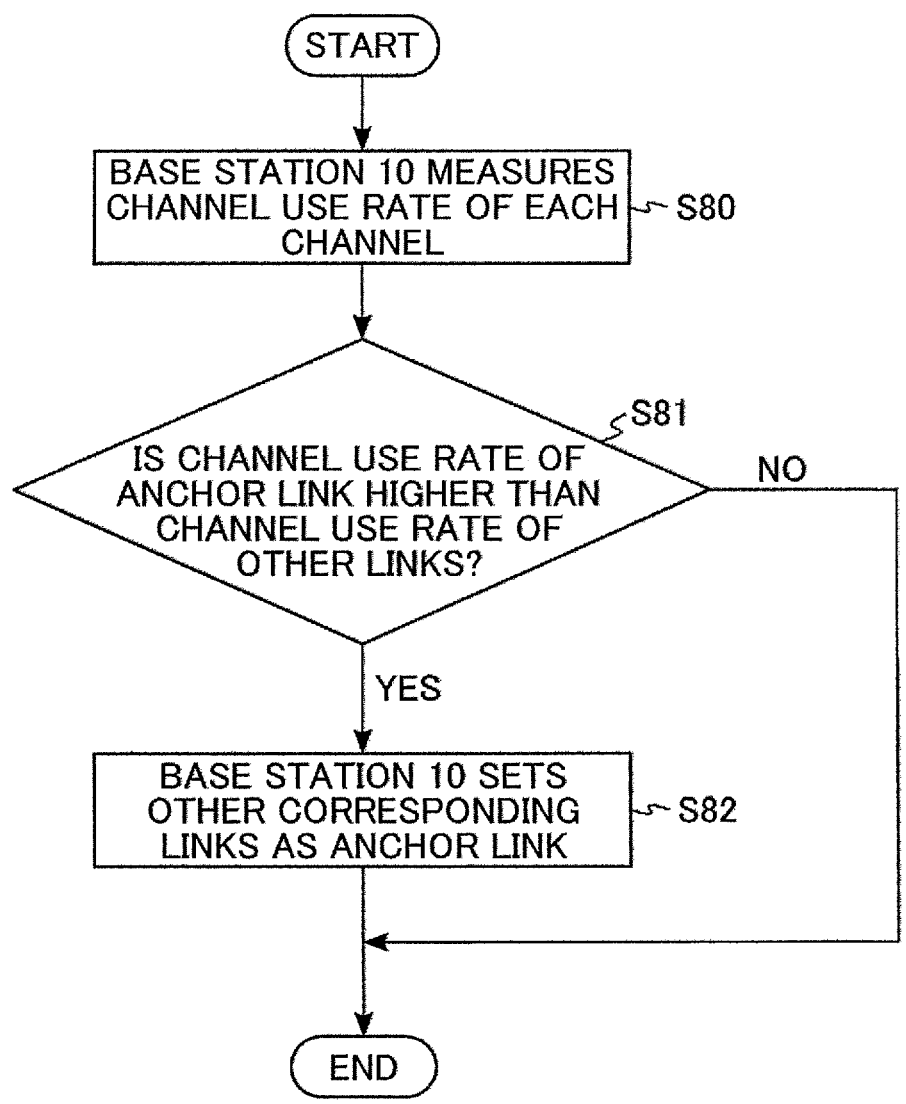
FIG. 34 is a flowchart showing an example of anchor link change processing in the wireless system according to the fourth modified example of the embodiment.

FIG. 34 shows an example of anchor link change processing in the wireless system 1 according to the fourth modified example of the embodiment. As shown in FIG. 34, the base station 10 measures a channel use rate of each channel (step S80). Then, the link management unit LM1 of the base station 10 checks whether the channel use rate of the anchor link is higher than the channel use rate of another link (step S81). If the channel use rate of the anchor link is lower than the channel use rate of the other link (No in step S81), the link management unit LM1 of the base station 10 maintains the settings of the anchor link. On the other hand, if the channel use rate of the anchor link is higher than the channel use rate of the other link (Yes in step S81), the link management unit LM1 of the base station 10 sets the other link as the anchor link (S82).

As described above, the anchor link may be changed based on the measurement result of the communication quality of each link by the base station 10. In addition, in the wireless system 1 according to the fourth modified example of the embodiment, for example, the anchor link is used as a main link of communication, and the other link is used as an auxiliary link. In this case, the base station 10 uses, for example, a channel having a low channel use rate as an anchor link for normal data exchange. In addition, when an amount of traffic increases, for example, the base station 10 uses the other link as an auxiliary link, and uses both the anchor link and the auxiliary link. As a result, the wireless system 1 according to the fourth modified example of the embodiment can improve the communication efficiency of the multi-link.

<5> Others

In the above-described embodiments, each STA function may notify the corresponding link management unit LM of the fact that the link cannot be maintained in such a case caused by movement of the terminal apparatus 20, or the like. In addition, the link management unit LM2 of the terminal apparatus 20 may change the state of a multi-link with the link management unit LM1 of the base station 10 based on a notification from the STA function. Specifically, for example, the link management unit LM2 of the terminal apparatus 20 and the link management unit LM1 of the base station 10 may change the STA function to be used in the multi-link as appropriate. If the state of the multi-link is changed, the link management units LM1 and LM2 update the link management information 121 and 221, respectively. Furthermore, the link management units LM1 and LM2 may update the association between traffic and the STA function according to an increase or decrease in the number of links.

The configurations of the wireless systems 1 according to the embodiments are merely examples. For example, although a case where each of the base station 10 and the terminal apparatus 20 has three STA functions (wireless signal processing units) has been exemplified, the present invention is not limited to this. The base station 10 is only required to include at least two wireless signal processing units. Similarly, the terminal apparatus 20 is only required to include at least two wireless signal processing units. In addition, the number of channels that can be processed by each STA function can be set appropriately according to the frequency band to be used. Each of the wireless communication modules 14 and 24 may correspond to wireless communication in a plurality of frequency bands by a plurality of communication modules, or may correspond to wireless communication in a plurality of frequency bands by one communication module.

In addition, the functional configurations of the base station 10 and the terminal apparatus 20 in the wireless system 1 according to the embodiments are merely examples. The functional configurations of the base station 10 and the terminal apparatus 20 may have other names and groupings as long as the operations described in each embodiment can be performed.

Furthermore, in the wireless system 1 according to the embodiments, the CPU included in each of the base station 10 and the terminal apparatus 20 may be another circuit. For example, a micro processing unit (MPU) or the like may be used in place of the CPU. In addition, each of the processing operations described in each embodiment may be realized using dedicated hardware. The wireless system 1 according to each embodiment may perform both processing executed by software and processing executed by hardware, or may perform only one of them.

In each embodiment, the flowchart used to describe the operations is merely an example. Each operation described in the embodiments may be replaced within a range in which the order of the processing can be fulfilled, or other processing may be added. In addition, the format of the wireless frame described in the above embodiments is merely an example. The wireless system 1 may use other formats of wireless frame as long as the operation described in each embodiment can be performed.

The present invention is not limited to the above embodiments, and can be modified in various ways without departing from the scope thereof at the implementation stage. In addition, each of the embodiments may be combined appropriately, and in such a case, advantageous effects of the combinations can be obtained. Further, the foregoing embodiments include various inventions, and various inventions can be extracted by selecting combinations of the plurality of constituent elements disclosed herein. For example, even if several constituent elements are removed from all the constituent elements described in the embodiments, configurations in which those constituent elements are removed can be extracted as an invention as long as the problem can be solved and the advantageous effects can be obtained.

REFERENCE SIGNS LIST

1 Wireless system
10 Base station
20 Terminal Apparatus
30 Server
11, 21 CPU
12, 22 ROM
13, 23 RAM
14, 24 Wireless communication module
15 Wired communication module
25 Display
26 Storage
LM1, LM2 Link management unit
100, 200 Data Processing unit
110, 210 MAC frame processing unit
120, 220 Management unit
121, 221 Link management information
122, 222 Association processing unit
123, 223 Authentication processing unit
124, 224 Quality measurement unit
125 Data categorizing unit
126 Transmission queue
127 CSMA/CA execution unit
128 Data collision management unit
130, 140, 150, 230, 240, 250 Wireless signal processing unit

What is claimed is:

1. A base station configured to communicate with a terminal apparatus, comprising:
a first wireless signal processing circuit configured to establish a first link with the terminal apparatus;
a second wireless signal processing unit circuit configured to establish, with the terminal apparatus, a second link different from the first link; and
processing circuitry configured to:
establish a multi-link with the terminal apparatus using the first link and the second link;
set either the first link or the second link as a predetermined link to be used in periodically transmission of a beacon frame containing control information for the multi-link;
transmit, to the terminal apparatus, the beacon frame containing first information for the first link and second information for the second link using the first link set as the predetermined link, wherein the beacon frame is not transmitted using the second link not set as the predetermined link; and transmit, if setting of the predetermined link is changed from the first link to the second link, the beacon frame using the second link set as the predetermined link after change of the setting of the predetermined link is notified to the terminal apparatus.

2. A terminal apparatus configured to communicate with a base station, comprising:

a first wireless signal processing circuit configured to establish a first link with the base station;

a second wireless signal processing circuit configured to establish, with the base station, a second link different from the first link; and processing circuitry a link management unit configured to:

establish a multi-link with the base station using the first link and the second link;

set either the first link or the second link as a predetermined link to be used in periodically reception of a beacon frame containing control information for the multi-link;

receive, from the base station, the beacon frame containing information for the first link and information for the second link using the first link set as the predetermined link, wherein the beacon frame is not received using the second link not set as the predetermined link; and receive, if setting of the predetermined link is changed from the first link to the second link, the beacon frame using the second link set as the predetermined link after change of the setting of the predetermined link is notified from the base station.

* * * * *